United States Patent
Hosomizu et al.

(10) Patent No.: US 12,497,496 B2
(45) Date of Patent: Dec. 16, 2025

(54) RESIN COMPOSITION AND POWER CABLE

(71) Applicant: SUMITOMO ELECTRIC INDUSTRIES, LTD., Osaka (JP)

(72) Inventors: Kohei Hosomizu, Osaka (JP); Shoma Suzuki, Osaka (JP); Takanori Yamazaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 188 days.

(21) Appl. No.: 18/268,993

(22) PCT Filed: Dec. 16, 2021

(86) PCT No.: PCT/JP2021/046635
§ 371 (c)(1),
(2) Date: Jun. 22, 2023

(87) PCT Pub. No.: WO2022/163198
PCT Pub. Date: Aug. 4, 2022

(65) Prior Publication Data
US 2024/0059864 A1    Feb. 22, 2024

(30) Foreign Application Priority Data

Jan. 29, 2021 (JP) .................. 2021-013275
Jan. 29, 2021 (JP) .................. 2021-013277

(51) Int. Cl.
*C08K 3/36* (2006.01)
*C08K 9/06* (2006.01)
(Continued)

(52) U.S. Cl.
CPC .............. *C08K 3/36* (2013.01); *C08K 9/06* (2013.01); *H01B 3/307* (2013.01); *H01B 9/00* (2013.01); *C08L 2203/202* (2013.01)

(58) Field of Classification Search
CPC ...................................................... H01B 9/027
(Continued)

(56) References Cited

U.S. PATENT DOCUMENTS

| 4,011,128 A * | 3/1977 | Suzuki | B29C 48/902 26/85 |
| 2011/0147639 A1* | 6/2011 | Wevers | C08L 23/04 252/62 |

(Continued)

FOREIGN PATENT DOCUMENTS

| JP | H11-16421 A | 1/1999 |
| JP | 2011-63691 A | 3/2011 |

(Continued)

OTHER PUBLICATIONS

Roy, M. et al., "Polymer Nanocomposite Dielectrics—The Role of the Interface", IEEE Transactions on Dielectrics and Electrical Insulation, vol. 12, No. 4, Aug. 2005, pp. 629-643.

*Primary Examiner* — Chau N Nguyen
(74) *Attorney, Agent, or Firm* — Renner, Otto, Boisselle & Sklar, LLP

(57) ABSTRACT

A resin composition contains a base resin including a polyolefin and an inorganic filler including silicon dioxide and surface-treated with a silane coupling agent. A remaining rate R of the inorganic filler in a fractured frozen surface is 50% or more. The remaining rate R is calculated using the following expression (1). R=(Df/Dc)×100 . . . (1). Df represents a density of the inorganic filler remaining in a fractured surface of a sheet formed of the resin composition containing the base resin and the inorganic filler, when the sheet is immersed in liquid nitrogen for 1 hour and then fractured. Dc represents a reference density of the inorganic filler detected in a cut surface of the sheet formed of the resin (Continued)

composition, when the sheet is cut at 24° C. using a focused ion beam without being frozen.

15 Claims, 1 Drawing Sheet

(51) Int. Cl.
*H01B 3/30* (2006.01)
*H01B 9/00* (2006.01)

(58) Field of Classification Search
USPC ..................................... 174/102 SC, 120 SC
See application file for complete search history.

(56) References Cited

U.S. PATENT DOCUMENTS

| | | | | |
|---|---|---|---|---|
| 2017/0330645 | A1* | 11/2017 | Yamazaki | B29C 48/154 |
| 2019/0096548 | A1* | 3/2019 | Yoshida | B32B 27/42 |
| 2020/0270426 | A1 | 8/2020 | Hosomizu et al. | |
| 2020/0273598 | A1 | 8/2020 | Hosomizu et al. | |
| 2020/0279672 | A1 | 9/2020 | Hosomizu et al. | |
| 2022/0411639 | A1* | 12/2022 | Oh | C09C 3/041 |

FOREIGN PATENT DOCUMENTS

| | | |
|---|---|---|
| JP | 2013-203650 A | 10/2013 |
| JP | 2020-132817 A | 8/2020 |
| WO | 2015/030055 A | 3/2015 |

\* cited by examiner

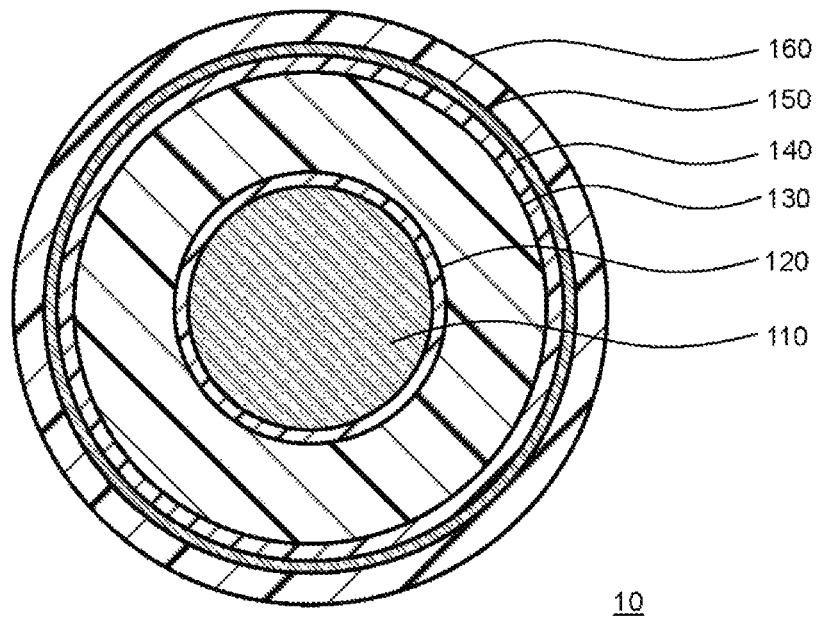

RESIN COMPOSITION AND POWER CABLE

TECHNICAL FIELD

The present disclosure relates to a resin composition and a power cable.

The present application claims the benefit of priority based on Japanese Patent Application "No. 2021-13275" filed on Jan. 29, 2021 and Japanese Patent Application "No. 2021-13277" filed on the same day, which are incorporated herein by reference in their entireties.

BACKGROUND ART

Recent years have seen development of solid insulation DC power cables (hereinafter abbreviated as "DC power cables") for DC power transmission applications. When a high voltage is applied to a DC power cable, space charge may be generated in an insulating layer of the DC power cable, and DC characteristics (volume resistivity, DC breakdown field strength, space charge characteristics, etc.) of the insulating layer may deteriorate.

Therefore, in order to suppress accumulation of space charge in an insulating layer of a DC power cable, an inorganic filler having polarity such as carbon black or magnesium oxide (MgO) is sometimes added to a resin composition constituting the insulating layer (see Patent Document 1, for example).

CITATION LIST

Patent Document

Patent Document 1: JP H11-16421A

SUMMARY OF INVENTION

An aspect of the present disclosure provides a resin composition including:
a base resin including a polyolefin; and
an inorganic filler including silicon dioxide and surface-treated with a silane coupling agent,
wherein a remaining rate R of the inorganic filler in a fractured frozen surface is 50% or more,
the remaining rate R being calculated using the following expression (1), $$R = (Df/Dc) \times 100 \tag{1}$$

where Df represents a density of the inorganic filler remaining in a fractured surface of a sheet formed of the resin composition containing the base resin and the inorganic filler, when the sheet is immersed in liquid nitrogen for 1 hour and then fractured, and
Dc represents a reference density of the inorganic filler detected in a cut surface of the sheet formed of the resin composition, when the sheet is cut at 24° C. using a focused ion beam without being frozen.

Another aspect of the present disclosure provides a power cable including:
a conductor; and
an insulating layer provided so as to cover an outer circumference of the conductor,
wherein the insulating layer is constituted by a resin composition containing: a base resin including a polyolefin; and an inorganic filler including silicon dioxide and surface-treated with a silane coupling agent, and a remaining rate R of the inorganic filler in a fractured frozen surface is 50% or more,
the remaining rate R being calculated using the following expression (1), $$R = (Df/Dc) \times 100 \tag{1}$$

where Df represents a density of the inorganic filler remaining in a fractured surface of a sheet formed from the insulating layer, when the sheet is immersed in liquid nitrogen for 1 hour and then fractured, and
Dc represents a reference density of the inorganic filler detected in a cut surface of the sheet formed from the insulating layer, when the sheet is cut at 24° C. using a focused ion beam without being frozen.

Another aspect of the present disclosure provides a power cable including:
a conductor; and
an insulating layer provided so as to cover an outer circumference of the conductor,
wherein the insulating layer is constituted by a resin composition containing: a base resin including a polyolefin; and an inorganic filler including silicon dioxide and surface-treated with a silane coupling agent,
a content N of the inorganic filler in the resin composition is 0.1 parts by mass or more and 5 parts by mass or less with respect to 100 parts by mass of the base resin, and
the following expression (2) is satisfied, $$V < 2.5N + 67.5 \tag{2}$$

where V represents brightness in a HSV color space measured by forming a sheet with a thickness of 2 mm from the insulating layer, folding the sheet at 24° C., and observing a cross section of a folded portion of the sheet, and the unit used to express V is %,
when a sheet of an insulating layer that does not contain the inorganic filler is folded under the same conditions and a folded cross section of the sheet is observed, V is 50%, and
when a sheet of an insulating layer containing 5 parts by mass of an inorganic filler that has not been surface-treated is folded under the same conditions and a folded cross section of the sheet is observed, V is 80%.

BRIEF DESCRIPTION OF DRAWINGS

FIG. 1 is a schematic cross-sectional view taken along a plane orthogonal to an axial direction of a DC power cable according to an embodiment of the present disclosure.

DESCRIPTION OF EMBODIMENTS

Technical Problem

An object of the present disclosure is to provide a technology that can suppress deterioration of DC characteristics of a DC power cable due to a temperature change.

Advantageous Effects of Invention

According to the present disclosure, it is possible to suppress deterioration of DC characteristics of a DC power cable due to a temperature change.

DESCRIPTION OF EMBODIMENTS OF THE PRESENT DISCLOSURE

<Findings Obtained by Inventors>

First, an overview of findings obtained by the inventors will be described.

(i) Findings Relating to Adhesiveness of Inorganic Filler

When the inorganic filler described above is dispersed in an insulating layer, space charge generated in the insulating layer can be trapped by the dispersed inorganic filler. Thus, local accumulation of space charge in the insulating layer can be suppressed and DC characteristics of a DC power cable can be improved. Accordingly, in order to obtain desired DC characteristics of the DC power cable, it is important to appropriately take the inorganic filler into the insulating layer.

A DC power cable may be installed in an environment in which a temperature change width is large, for example. DC characteristics of conventional DC power cables may deteriorate (decline or become worse) in an environment in which a temperature change width is large.

The inventors carried out intensive studies on this matter, and found that deterioration of DC characteristics of a DC power cable relative to a temperature change depends on adhesiveness of an inorganic filler added to an insulating layer of the DC power cable. It is thought this is due to the following mechanism.

When the temperature of the installation environment changes, thermal expansion and contraction of the insulating layer of the DC power cable occurs. As a result of the thermal expansion and contraction of the insulating layer, thermal stress is applied between a base resin constituting the insulating layer and the inorganic filler. If the width of the temperature change is large, the thermal stress becomes large. Also, if the temperature change occurs for a long period of time, the influence of thermal stress accumulates in the insulating layer.

At this time, if adhesiveness between the base resin and the inorganic filler is low or the adhesiveness decreases with elapse of time, the inorganic filler may separate from the base resin due to thermal stress generated through thermal expansion and contraction of the insulating layer or accumulation of the influence of the thermal stress, and a gap may be formed between the base resin and the inorganic filler. If a gap is formed between the base resin and the inorganic filler, insulating properties of the insulating layer locally deteriorate and space charge trapping ability of the inorganic filler deteriorates. Consequently, DC characteristics of the DC power cable may deteriorate due to the temperature change.

(ii) Findings Relating to Inorganic Filler Surface-Treating Step

Through further intensive studies, the inventors found that, among steps for manufacturing the DC power cable, conditions of a step of surface-treating the inorganic filler with a silane coupling agent affect the adhesiveness of the inorganic filler described above.

For example, if the moisture content in an atmosphere in which the inorganic filler is surface-treated in the surface treatment step is high, (the silane coupling agent may be excessively hydrolyzed) and molecules of the silane coupling agent may bind together in the atmosphere. If molecules of the silane coupling agent bind together in the atmosphere, the density of the silane coupling agent in the atmosphere decreases, and a coverage rate of the silane coupling agent to the inorganic filler decreases. As a result, adhesiveness of the inorganic filler to the base resin may decrease.

Also, the inorganic filler absorbs moisture if the moisture content in the atmosphere in which the inorganic filler is surface-treated in the surface treatment step is high, for example. If the inorganic filler absorbs moisture during the surface treatment step, the inorganic filler may agglomerate. The inorganic filler may agglomerate in a case where an initial moisture content in the inorganic filler before the surface treatment step is high as well. Particularly in a case where the surface treatment step is performed using a dry method, particles of the inorganic filler cannot be sufficiently stirred, and agglomeration of the inorganic filler is facilitated. If the inorganic filler agglomerates, mutually contacting portions of agglomerated particles of the inorganic filler cannot be sufficiently surface-treated with the silane coupling agent, and the coverage rate of the silane coupling agent to the inorganic filler decreases. For this reason as well, adhesiveness of the inorganic filler to the base resin may decrease.

The present disclosure is based on the above findings (i) and (ii) obtained by the inventors.

Embodiments of the Present Disclosure

Next, embodiments of the present disclosure will be listed and described.

[1] A resin composition according to an aspect of the present disclosure includes:
 a base resin including a polyolefin; and
 an inorganic filler including silicon dioxide and surface-treated with a silane coupling agent,
 wherein a remaining rate R of the inorganic filler in a fractured frozen surface is 50% or more,
 the remaining rate R being calculated using the following expression (1), $$R=(Df/Dc)\times 100 \qquad (1)$$

where Df represents a density of the inorganic filler remaining in a fractured surface of a sheet formed of the resin composition containing the base resin and the inorganic filler, when the sheet is immersed in liquid nitrogen for 1 hour and then fractured, and
 Dc represents a reference density of the inorganic filler detected in a cut surface of the sheet formed of the resin composition, when the sheet is cut at 24° C. using a focused ion beam without being frozen.

According to this configuration, deterioration of DC characteristics of a DC power cable due to a temperature change can be suppressed.

[2] A power cable according to another aspect of the present disclosure includes:
 a conductor; and
 an insulating layer provided so as to cover an outer circumference of the conductor,
 wherein the insulating layer is constituted by a resin composition containing: a base resin including a polyolefin; and an inorganic filler including silicon dioxide and surface-treated with a silane coupling agent, and
 a remaining rate R of the inorganic filler in a fractured frozen surface is 50% or more,
 the remaining rate R being calculated using the following expression (1), $$R=(Df/Dc)\times 100 \qquad (1)$$

where Df represents a density of the inorganic filler remaining in a fractured surface of a sheet formed from the insulating layer, when the sheet is immersed in liquid nitrogen for 1 hour and then fractured, and Dc represents a reference density of the inorganic filler detected in a cut surface of the sheet formed from the insulating layer, when the sheet is cut at 24° C. using a focused ion beam without being frozen.

According to this configuration, deterioration of DC characteristics of a DC power cable due to a temperature change can be suppressed.

[3] In the power cable described above in [2], when a DC electric field of 200 kV/mm is applied in a thickness direction of the insulating layer at a temperature of 90° C. after a predetermined heat cycle test, the time it takes until a dielectric breakdown occurs in the insulating layer is 1 hour or longer, the heat cycle test being a test in which a cycle including a step of holding the power cable at a temperature of −10° C. for 8 hours and a step of holding the power cable at a temperature of 24° C. for 16 hours is repeated for 3 months.

According to this configuration, deterioration of DC characteristics of a DC power cable due to a temperature change can be suppressed.

[4] In the power cable described above in [2] or [3], the inorganic filler is surface-treated with a material other than silane coupling agents having three hydrolyzable groups and only one alkyl group per silicon atom, as the silane coupling agent.

According to this configuration, adhesiveness of the inorganic filler to the base resin can be significantly improved.

[5] In the power cable described above in [4], the inorganic filler is surface-treated with at least one material selected from vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, dimethyldimethoxysilane, methoxytrimethylsilane, hexamethyldisilazane, dimethyldichlorosilane, and trimethylchlorosilane, as the silane coupling agent.

According to this configuration, adhesiveness of the inorganic filler to the base resin can be significantly improved.

[6] In the power cable described above in any one of [2] to [5], the inorganic filler is surface-treated with a material having a vinyl group at a terminal end, as the silane coupling agent.

According to this configuration, adhesiveness of the inorganic filler to the base resin can be significantly improved.

[7] In the power cable described above in any one of [2] to [5], the inorganic filler is surface-treated with a material having an amino group, as the silane coupling agent.

According to this configuration, adhesiveness of the inorganic filler to the base resin can be significantly improved.

[8] In the power cable described above in any one of [4] to [7], the remaining rate R is 60% or more.

According to this configuration, deterioration of DC characteristics of a DC power cable due to a temperature change can be significantly suppressed.

[9] In the power cable described above in any one of [4] to [8], when a DC electric field of 200 kV/mm is applied in a thickness direction of the insulating layer at a temperature of 90° C. after a predetermined heat cycle test, the time it takes until a dielectric breakdown occurs in the insulating layer is 2 hours or longer, the heat cycle test being a test in which a cycle including a step of holding the power cable at a temperature of −10° C. for 8 hours and a step of holding the power cable at a temperature of 24° C. for 16 hours is repeated for 3 months.

According to this configuration, deterioration of DC characteristics of a DC power cable due to a temperature change can be significantly suppressed.

[10] A power cable according to another aspect of the present disclosure includes:

a conductor; and an insulating layer provided so as to cover an outer circumference of the conductor, wherein the insulating layer is constituted by a resin composition containing: a base resin including a polyolefin; and an inorganic filler including silicon dioxide and surface-treated with a silane coupling agent, a content N of the inorganic filler in the resin composition is 0.1 parts by mass or more and 5 parts by mass or less with respect to 100 parts by mass of the base resin, and the following expression (2) is satisfied, $$V < 2.5N + 67.5 \quad (2)$$

where V represents brightness in a HSV color space measured by forming a sheet with a thickness of 2 mm from the insulating layer, folding the sheet at 24° C., and observing a cross section of a folded portion of the sheet, and the unit used to express V is %, when a sheet of an insulating layer that does not contain the inorganic filler is folded under the same conditions and a folded cross section of the sheet is observed, V is 50%, and when a sheet of an insulating layer containing 5 parts by mass of an inorganic filler that has not been surface-treated is folded under the same conditions and a folded cross section of the sheet is observed, V is 80%.

According to this configuration, deterioration of DC characteristics of a DC power cable due to a temperature change can be suppressed.

[11] In the power cable described above in [10], when a DC electric field of 200 kV/mm is applied in a thickness direction of the insulating layer at a temperature of 90° C. after a predetermined heat cycle test, the time it takes until a dielectric breakdown occurs in the insulating layer is 1 hour or longer, the heat cycle test being a test in which a cycle including a step of holding the power cable at a temperature of −10° C. for 8 hours and a step of holding the power cable at a temperature of 24° C. for 16 hours is repeated for 3 months.

According to this configuration, deterioration of DC characteristics of a DC power cable due to a temperature change can be suppressed.

[12] In the power cable described above in [10] or [11],
the inorganic filler is surface-treated with a material other than silane coupling agents having three hydrolyzable groups and only one alkyl group per silicon atom, as the silane coupling agent.

According to this configuration, adhesiveness of the inorganic filler to the base resin can be significantly improved.

[13] In the power cable described above in [12],
the inorganic filler is surface-treated with at least one material selected from vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, dimethyldimethoxysilane, methoxytrimethylsilane, hexamethyldisilazane, dimethyldichlorosilane, and trimethylchlorosilane as the silane coupling agent.

According to this configuration, adhesiveness of the inorganic filler to the base resin can be significantly improved.

[14] In the power cable described above in any one of [10] to [13],
the inorganic filler is surface-treated with a material having a vinyl group at a terminal end, as the silane coupling agent.

According to this configuration, adhesiveness of the inorganic filler to the base resin can be significantly improved.

[15] In the power cable described above in any one of [10] to [13],
the inorganic filler is surface-treated with a material having an amino group, as the silane coupling agent.

According to this configuration, adhesiveness of the inorganic filler to the base resin can be significantly improved.

[16] The power cable described above in any one of [12] to [15], satisfying the following expression (3), $$V < 5N + 55 \quad (3).$$

According to this configuration, deterioration of DC characteristics of the power cable due to a temperature change can be significantly suppressed.

[17] In the power cable described above in any one of [12] to [16],
when a DC electric field of 200 kV/mm is applied in a thickness direction of the insulating layer at a temperature of 90° C. after a predetermined heat cycle test, the time it takes until a dielectric breakdown occurs in the insulating layer is 2 hours or longer,
the heat cycle test being a test in which a cycle including a step of holding the power cable at a temperature of −10° C. for 8 hours and a step of holding the power cable at a temperature of 24° C. for 16 hours is repeated for 3 months.

According to this configuration, deterioration of DC characteristics of a DC power cable due to a temperature change can be significantly suppressed.

DETAILS OF EMBODIMENT OF THE PRESENT DISCLOSURE

Next, an embodiment of the present disclosure will be described with reference to the drawings. Note that the present disclosure is not limited to the following examples, but is defined by the claims, and is intended to encompass all modifications within the meanings and scope that are equivalent to the claims.

Embodiment of the Present Disclosure (1) Resin Composition

A resin composition according to the present embodiment is a material that constitutes an insulating layer 130 of a DC power cable 10, which will be described later, and contains a base resin, an inorganic filler, a crosslinking agent, and other additives, for example.

(Base Resin)

The base resin (base polymer) is a resin component that is a main component of the resin composition. The base resin according to the present embodiment includes a polyolefin, for example. Examples of the polyolefin constituting the base resin include polyethylene, polypropylene, an ethylene-α-olefin copolymer, and a thermoplastic elastomer obtained by dispersing ethylene-propylene rubber in polypropylene or copolymerizing ethylene-propylene rubber with polypropylene. Among these, polyethylene is preferable. Note that two or more of these may be used in combination.

For example, low-density polyethylene (LDPE), medium-density polyethylene (MDPE), high-density polyethylene (HDPE), or the like can be used as polyethylene that constitutes the base resin. These polyethylene may be linear or branched, for example.

(Inorganic Filler)

The inorganic filler functions to suppress local accumulation of space charge in the insulating layer 130 by trapping space charge in the insulating layer 130. Thus, DC characteristics of the insulating layer 130 can be improved. Note that the "DC characteristics of the insulating layer 130" or "DC characteristics of the DC power cable 10" referred to in the present specification means the volume resistivity, the DC breakdown field strength, space charge characteristics, and the like of the insulating layer 130.

The inorganic filler includes silicon dioxide ($SiO_2$, hereinafter also referred to as "silica"), for example. The silicon dioxide used as the inorganic filler is not limited, but is at least any of fumed silica, colloidal silica, precipitated silica, and deflagration silica, for example. Among these, fumed silica is preferably used as the silicon dioxide.

In the present embodiment, the content (denoted by N in the following description) of the inorganic filler in the resin composition is not particularly limited, but is 0.1 parts by mass or more and 5 parts by mass or less with respect to 100 parts by mass of the base resin, for example. When the content of the inorganic filler is 0.1 parts by mass or more, space charge can be sufficiently trapped by the inorganic filler. On the other hand, when the content of the inorganic filler is 5 parts by mass or less, moldability of the resin composition can be improved, and dispersibility of the inorganic filler in the insulating layer 130 can be improved.

In the present embodiment, the mean volume diameter (MV, denoted by X in the following description) of the inorganic filler is not particularly limited, but is 1 m or less, for example, preferably 700 nm or less, and more preferably 100 nm or less.

Note that the "mean volume diameter (MV)" referred to here is calculated using the following expression in which $d_i$ represents the particle diameter of a particle and $V_i$ represents the volume of the particle.

$$MV = \Sigma(V_i d_i)/\Sigma V_i$$

Note that the mean volume diameter is measured using a dynamic light scattering particle diameter and particle size distribution measurement apparatus.

When the mean volume diameter of the inorganic filler is 1 m or less, the inorganic filler can be uniformly dispersed in the insulating layer 130. Consequently, the effect of improving DC characteristics with use of the inorganic filler can be stably obtained. Furthermore, when the mean volume diameter of the inorganic filler is in the preferable range of 700 nm or less or in the more preferable range of 100 nm or less, it becomes easier to uniformly disperse the inorganic filler in the insulating layer 130. Consequently, the effect of improving DC characteristics with use of the inorganic filler can be more stably obtained.

Note that the lower limit of the mean volume diameter of the inorganic filler is not particularly limited. However, from the viewpoint of stably forming the inorganic filler, the mean volume diameter of the inorganic filler is 1 nm or more, for example, and preferably 5 nm or more.

In the present embodiment, at least a portion of the inorganic filler is surface-treated with a silane coupling agent. In other words, at least a portion of the surface of the inorganic filler has a silyl group including a predetermined organic substituent, for example. With this configuration, it is possible to improve adhesiveness at an interface between the inorganic filler and the base resin, and improve mechanical characteristics and low-temperature characteristics of the insulating layer 130.

In the present embodiment, a reduction in the coverage rate of the silane coupling agent to the inorganic filler is suppressed by reducing the moisture content in an atmosphere in which the inorganic filler is subjected to a surface treatment step as described later. In other words, a reduction in the coverage rate of the silyl group on the surface of the inorganic filler is suppressed. By reducing the moisture content when surface treatment is performed, this effect can be obtained more than a certain level irrespective of the type of silane coupling agent used in the surface treatment. Consequently, adhesiveness of the inorganic filler to the base resin can be improved.

On the other hand, in the present embodiment, the inorganic filler is preferably surface-treated with a material other than silane coupling agents that have three hydrolyzable groups and only one alkyl group per silicon (Si) atom, as the silane coupling agent, for example. In the following description, a silane coupling agent that has three hydrolyzable groups and only one alkyl group per Si atom will also be referred to as a "monoalkyl silane coupling agent".

Examples of silane coupling agents that satisfy the above requirement include vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, dimethyldimethoxysilane, methoxytrimethylsilane, hexamethyldisilazane, dimethyldichlorosilane, and trimethylchlorosilane. Two or more of these may be used in combination.

When at least a portion of the inorganic filler is surface-treated with the silane coupling agent described above other than monoalkyl silane coupling agents, at least a portion of the surface of the inorganic filler has a silyl group other than a monoalkyl silyl group. Note that the monoalkyl silyl group is a silyl group in which an organic substituent other than remaining hydrolyzable groups is constituted only by an independent alkyl group. Although details of the mechanisms are unknown, adhesiveness of the inorganic filler to the base resin can be significantly improved with the above configuration when compared with a case where the inorganic filler is surface-treated with a monoalkyl silane coupling agent.

Alternatively, in the present embodiment, the inorganic filler is preferably surface-treated with a material that has a vinyl group at a terminal end, as the silane coupling agent, for example. In the following description, a silane coupling agent having a vinyl group at a terminal end will also be referred to as a "vinyl silane coupling agent". When at least a portion of the inorganic filler is surface-treated with a vinyl silane coupling agent as described above, at least a portion of the surface of the inorganic filler has a silyl group that includes a vinyl group at a terminal end. Therefore, the vinyl group derived from the vinyl silane coupling agent can be crosslinked with the base resin using a predetermined crosslinking agent in a crosslinking step after the surface treatment step. Consequently, adhesiveness of the inorganic filler to the base resin can be significantly improved.

Note that the above-described effect of improving adhesiveness of the inorganic filler can be obtained with use of a vinyl silane coupling agent other than vinyltrimethoxysilane and vinyltriethoxysilane listed above, so long as the vinyl silane coupling agent has a vinyl group at a terminal end.

Specifically, at least any of allyl trimethoxysilane, 7-octenyl trimethoxysilane, vinyl trichlorosilane, and the like can be used as a vinyl silane coupling agent other than those listed above.

Alternatively, in the present embodiment, the inorganic filler is preferably surface-treated with a material that has an amino group, as the silane coupling agent, for example. In the following description, a silane coupling agent having an amino group will also be referred to as an "amino silane coupling agent". When at least a portion of the inorganic filler is surface-treated with an amino silane coupling agent as described above, at least a portion of the surface of the inorganic filler has a silyl group that includes an amino group. Although details of the mechanisms are unknown, adhesiveness of the inorganic filler to the base resin can be significantly improved with this configuration.

An amino silane coupling agent is represented by the following formula (a), for example.

$$R^1{}_n SiX_{4-n} \qquad (a)$$

($R^1$ represents a monovalent hydrocarbon group including at least any one of a primary amino group, a secondary amino group, a tertiary amino group, an acid neutralizing group of an amino group, and a quaternary ammonium salt group, X represents a monovalent hydrolyzable group, and n represents an integer from 1 to 3. In the case where n is 2 or more, the plurality of R¹ may be the same as or different from each other.)

Examples of the monovalent hydrolyzable group represented by X include alkoxy groups having 1 to 3 carbon atoms and halogen groups.

Note that the above-described effect of improving adhesiveness of the inorganic filler can be obtained with use of an amino silane coupling agent other than N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, and 3-triethoxysilyl-N-(1,3-dimethylbutylidene)propylamine listed above, so long as the amino silane coupling agent is represented by the formula (a) shown above.

Specifically, it is possible to use, as other amino silane coupling agents, at least any of N-phenyl-3-aminopropyltrimethoxysilane, N-methyl-3-aminopropyltrimethoxysilane, N-ethyl-3-aminopropyltrimethoxysilane, N-butyl-3-aminopropyltrimethoxysilane, N,N-dimethyl-3-aminopropyltrimethoxysilane, N,N-diethyl-3-aminopropyltrimethoxysilane, N,N-dibutyl-3-aminopropyltrimethoxysilane, N-(vinylbenzyl)-3-aminopropyltrimethoxysilane hydrochloride, octadecyldimethyl(3-trimethoxysilylpropyl)ammonium chloride, tetradecyldimethyl(3-trimethoxysilylpropyl)ammonium chloride, N-trimethoxysilylpropyl-N,N,N-tri-n-butylammonium bromide, N-trimethoxysilylpropyl-N,N,N-tri-n-butylammonium chloride, and N-trimethoxysilylpropyl-N,N,N-trimethylammonium chloride, for example.

[Remaining Density of Inorganic Filler in Fractured Frozen Surface]

In the present embodiment, adhesiveness of the inorganic filler added to the insulating layer 130 with respect to the base resin is stably improved and the adhesiveness is maintained over time because the silane coupling agent described above is used and a surface treatment step, which will be described later, is performed.

However, it is difficult to directly measure adhesiveness of individual inorganic fillers to the base resin.

Therefore, as a method for evaluating adhesiveness of the inorganic filler to the base resin, the inventors formed a sheet from the insulating layer 130, froze the sheet, and then fractured the sheet, and measured the density of the inorganic filler remaining in a fractured surface of the sheet. In this measurement, when the frozen sheet is fractured, an inorganic filler whose adhesiveness is low scatters, and accordingly, such an inorganic filler does not remain in the fractured surface. Adhesiveness of individual inorganic fillers to the base resin can be measured by measuring a remaining density as described above. In the following description, the above-described density of the inorganic filler will also be referred to as a "remaining density of the inorganic filler in a fractured frozen surface".

As a result of the measurement, the inventors found that there is a correlation between DC characteristics of the DC power cable 10 after a predetermined heat cycle and the remaining density of the inorganic filler in a fractured frozen surface. Moreover, the inventors found that there is also a correlation between initial DC characteristics of the DC power cable 10 and the remaining density of the inorganic filler in a fractured frozen surface.

However, the density of the inorganic filler before the sheet is frozen and fractured may differ between insulating layers 130 that differ from each other in the content of the inorganic filler, the mean volume diameter of the inorganic filler, or the like. Therefore, it is not possible to directly compare remaining densities of the inorganic filler in fractured frozen surfaces of different insulating layers 130.

Therefore, the inventors made comparisons in terms of the rate of the remaining density of the inorganic filler after the sheet was frozen and fractured to the density of the inorganic filler before the sheet was frozen and fractured, and found that this rate in the DC power cable 10 according to the present embodiment satisfies a requirement described below irrespective of the content of the inorganic filler, the mean volume diameter of the inorganic filler, and the like. In the following description, this rate will also be referred to as the "remaining rate R of the inorganic filler in a fractured frozen surface".

That is, in the present embodiment, the remaining rate R of the inorganic filler in a fractured frozen surface is 50% or more, for example, preferably 60% or more, and more preferably 70% or more.

Note that the remaining rate R (unit: %) is calculated using the following expression (1).

$$R=(Df/Dc)\times 100 \qquad (1)$$

Df represents the above-described remaining density of the inorganic filler after the sheet is frozen and fractured (i.e., the remaining density in a fractured frozen surface). That is, Df represents the density of the inorganic filler remaining in a fractured surface of a sheet formed from the insulating layer 130, when the sheet is frozen by being immersed in liquid nitrogen for 1 hour and then fractured (by being bent). Dc represents the above-described density of the inorganic filler before the sheet is frozen and fractured. That is, Dc represents a reference density of the inorganic filler detected in a cut surface of the sheet formed from the insulating layer 130, when the sheet is cut at 24° C. using a focused ion beam without being frozen. Note that "24° C." is the temperature of the environment in which the sheet is processed using the focused ion beam.

[Brightness of Folded Cross Section of Insulating Layer]

Furthermore, as a method for evaluating adhesiveness of the inorganic filler to the base resin, the inventors measured brightness V of a folded cross section of the insulating layer 130 as described below. Specifically, first, a sheet with a thickness of 2 mm was formed from the insulating layer 130. After the sheet was formed, the sheet was folded by 180° at 24° C., and a cross section of the folded portion of the sheet was observed (imaged) using an optical microscope. Histogram analysis was performed on the obtained cross-sectional image using image analysis software to measure the brightness V in a HSV color space. Note that the HSV color space referred to here is a color space composed of hue H, saturation S, and brightness V.

The higher the brightness V of the folded cross section of the insulating layer 130 is, the whiter the folded cross section of the insulating layer 130 is and the lower the adhesiveness of the inorganic filler to the base resin is. On the other hand, the lower the brightness V of the folded cross section of the insulating layer 130 is, the more whitening of the folded cross section of the insulating layer 130 is suppressed and the higher the adhesiveness of the inorganic filler to the base resin is.

Whitening of the folded cross section of the insulating layer 130 referred to here is a phenomenon that is thought to occur due to the following mechanism, for example. If the adhesiveness of the inorganic filler to the base resin is low, the inorganic filler separates from the base resin due to stress applied when the insulating layer 130 is folded, and a microscopic gap is formed between the base resin and the inorganic filler. If a gap is formed between the base resin and the inorganic filler, light is scattered due to the gap in a folded cross section of the insulating layer 130, and the cross section appears to be whitened. Therefore, it is possible to measure an index value corresponding to the number of gaps formed in a folded cross section of the insulating layer 130 by measuring the brightness V of the folded cross section of the insulating layer 130. Consequently, it is possible to evaluate adhesiveness of the inorganic filler to the base resin.

In the present embodiment, observation conditions (for example, brightness of a light source) in the measurement of the brightness V of a folded cross section of the insulating layer 130 are set as follows, for example. Note that the unit of the brightness V is %. Specifically, the observation conditions are set in such a manner that, when a sheet formed from an insulating layer that does not contain the inorganic filler is folded under the same conditions and a folded cross section of the sheet is observed, the brightness V of the cross section is 50%. Also, the observation conditions are set in such a manner that, when a sheet formed from an insulating layer containing 5 parts by mass of the inorganic filler that has not been surface-treated is folded under the same conditions and a folded cross section of the sheet is observed, the brightness V of the cross section is 80%. Note that a base resin contained in a resin composition that was used as a reference to determine settings regarding the brightness V is a polyolefin similar to that contained in the resin composition of the present embodiment. The brightness V of a folded cross section of the insulating layer 130 according to the present embodiment was measured under the observation conditions described above.

As a result of the measurement, the inventors found that there is a correlation between DC characteristics of the DC power cable 10 after the predetermined heat cycle and the brightness V of the folded cross section of the insulating layer 130 because bending stress applied when the insulating layer 130 is folded can be thought to correspond to thermal stress applied during the predetermined heat cycle. Furthermore, the inventors found that there is also a correlation between initial DC characteristics of the DC power cable 10 and the brightness V of the folded cross section of the insulating layer 130.

Specifically, in the present embodiment, the following expression (2) is satisfied, and the following expression (3) is preferably satisfied.

$$V < 2.5N + 67.5 \quad (2)$$

$$V < 5N + 55 \quad (3)$$

In the present embodiment, the requirement that "the remaining density of the inorganic filler in a fractured frozen surface is 50% or more, preferably 60% or more, and more preferably 70% or more" and the requirement that "the brightness V of a folded cross section of the insulating layer 130 satisfies the expression (2), and preferably satisfies the expression (3)" will also be collectively referred to as "requirements for the adhesiveness of the inorganic filler".

[DC Characteristics Obtained by Satisfying Requirements for Adhesiveness of Inorganic Filler]

It is possible to improve DC characteristics of the DC power cable 10 after the predetermined heat cycle and initial DC characteristics of the DC power cable 10 by satisfying the requirements for the adhesiveness of the inorganic filler as described above.

If the remaining rate R of the inorganic filler in a fractured frozen surface is less than 50% and the brightness V of a folded cross section of the insulating layer 130 does not satisfy the expression (2), the inorganic filler may separate from the base resin due to thermal stress generated through thermal expansion and contraction of the insulating layer 130 or accumulation of the influence of the thermal stress, and a gap may be formed between the base resin and the inorganic filler. If a gap is formed between the base resin and the inorganic filler, insulating properties of the insulating layer locally deteriorate and space charge trapping ability of the inorganic filler deteriorates. Consequently, DC characteristics of the DC power cable 10 may deteriorate (decline or become worse) due to a temperature change. Specifically, when a DC electric field of 200 kV/mm is applied in a thickness direction of the insulating layer 130 at a temperature of 90° C. after a predetermined heat cycle test, the time it takes until a dielectric breakdown occurs in the insulating layer 130 may be shorter than 1 hour.

Also, if the remaining rate R of the inorganic filler in a fractured frozen surface is less than 50% and the brightness V of a folded cross section of the insulating layer 130 does not satisfy the expression (2), adhesiveness of the inorganic filler to the base resin may be low even before a temperature change. In this case, space charge generated in the insulating layer 130 may not be sufficiently trapped by the inorganic filler, and the space charge may be locally accumulated in the insulating layer. As a result, DC characteristics of the DC power cable 10 may deteriorate even in an initial state before a temperature change.

In contrast, in the present embodiment, the remaining rate R of the inorganic filler in a fractured frozen surface is 50% or more or the brightness V of a folded cross section of the insulating layer 130 satisfies the expression (2), and accordingly, it is possible to suppress separation of the inorganic filler from the base resin due to thermal stress generated through thermal expansion and contraction of the insulating layer 130. Also, even when a temperature change occurs for a long period of time and the influence of thermal stress accumulates in the insulating layer 130, it is possible to suppress separation of the inorganic filler from the base resin due to accumulation of the influence of thermal stress. By suppressing separation of the inorganic filler as described above, it is possible to suppress formation of a gap between the base resin and the inorganic filler. Accordingly, a local reduction in insulating properties of the insulating layer 130 can be suppressed, and a reduction in space charge trapping ability of the inorganic filler can be suppressed. Consequently, deterioration of DC characteristics of the DC power cable 10 due to a temperature change can be suppressed. Specifically, when a DC electric field of 200 kV/mm is applied in the thickness direction of the insulating layer 130 at a temperature of 90° C. after the predetermined heat cycle test, the time it takes until a dielectric breakdown occurs in the insulating layer 130 is 1 hour or longer.

Furthermore, when the remaining rate R of the inorganic filler in a fractured frozen surface is 60% or more or more preferably 70% or more, or the brightness V of a folded cross section of the insulating layer 130 satisfies the expression (3), deterioration of DC characteristics of the DC power cable 10 due to a temperature change can be significantly suppressed. Specifically, when a DC electric field of 200 kV/mm is applied in the thickness direction of the insulating layer 130 at a temperature of 90° C. after the predetermined heat cycle test, the time it takes until a dielectric breakdown occurs in the insulating layer 130 is 2 hours or longer.

Also, in the present embodiment, the remaining rate R of the inorganic filler in a fractured frozen surface is 50% or more or the brightness V of a folded cross section of the insulating layer 130 satisfies the expression (2), and accordingly, adhesiveness of the inorganic filler to the base resin is high before a temperature change as well. Therefore, space charge generated in the insulating layer 130 can be sufficiently trapped by the inorganic filler, and local accumulation of the space charge in the insulating layer 130 can be suppressed. Consequently, DC characteristics of the DC power cable 10 in the initial state before a temperature change can be improved.

(Crosslinking Agent)

The crosslinking agent is an organic peroxide, for example. Examples of organic peroxides include dicumyl peroxide, 2,5-dimethyl-2,5-di(t-butylperoxy)hexane, and 1,3-bis(t-butylperoxyisopropyl)benzene. Two or more of these may be used in combination.

Other Additives

The resin composition may further contain an antioxidant and a lubricant, for example.

Examples of the antioxidant include 2,2-thio-diethylenebis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl) propionate, 2,4-bis-[(octylthio)methyl]-o-cresol, 2,4-bis-(n-octylthio)-6-(4-hydroxy-3,5-di-t-butylanilino)-1,3,5-triazine, bis[2-methyl-4-{3-n-alkyl (C12 or C14) thiopropionyloxy}-5-t-butylphenyl]sulfide, and 4,4'-thiobis (3-methyl-6-t-butylphenol). Two or more of these may be used in combination.

The lubricant functions to suppress agglomeration of the inorganic filler and improve fluidity of the resin composition in extrusion molding of the insulating layer 130. The lubricant in the present embodiment is a fatty acid metal salt or a fatty acid amide, for example. Examples of fatty acid metal salts include magnesium stearate, zinc stearate, aluminum stearate, and magnesium montanate. Examples of fatty acid amides include oleic acid amides and stearic acid amides. Two or more of these may be used in combination.

Note that the resin composition may further contain a colorant, for example.

(2) DC Power Cable

Next, a DC power cable according to the present embodiment will be described using FIG. 1. FIG. 1 is a cross-sectional view taken along a plane orthogonal to an axial direction of the DC power cable according to the present embodiment.

A DC power cable 10 according to the present embodiment is configured as a so-called solid insulation DC power cable and includes a conductor 110, an inner semi-conductive layer 120, the insulating layer 130, an outer semi-conductive layer 140, a shielding layer 150, and a sheath 160, for example.

(Conductor (Conductive Portion))

The conductor 110 is formed by twisting a plurality of conductor core wires (conductive core wires) that contain pure copper, a copper alloy, aluminum, an aluminum alloy, or the like, for example.

(Inner Semi-Conductive Layer)

The inner semi-conductive layer 120 is provided so as to cover the outer circumference of the conductor 110. The inner semi-conductive layer 120 is semi-conductive, and is configured to keep an electric field from concentrating on the outer surface side of the conductor 110. The inner semi-conductive layer 120 contains conductive carbon black and at least any of an ethylene-ethyl acrylate copolymer, an ethylene-methyl acrylate copolymer, an ethylene-butyl acrylate copolymer, and an ethylene-vinyl acetate copolymer, for example.

(Insulating Layer)

The insulating layer 130 is provided so as to cover the outer circumference of the inner semi-conductive layer 120. The insulating layer 130 is constituted by the above-described resin composition according to the present embodiment.

In the present embodiment, the inorganic filler strongly adheres to the base resin constituting the insulating layer 130 because a surface treatment step, which will be described later, is performed.

Also, in the present embodiment, the insulating layer 130 is crosslinked as a result of the resin composition according to the present embodiment being extrusion molded and heated, for example. That is, for example, polyethylene used as the base resin in the resin composition constituting the insulating layer is crosslinked polyethylene. Note that non-crosslinked polyethylene may also be contained in the resin composition.

In the case where the inorganic filler is surface-treated with a vinyl silane coupling agent in the present embodiment, at least some organic substituents included in silyl groups bound to the surface of the inorganic filler are crosslinked with (bound to) the base resin, for example. Note that vinyl groups may remain in some other silyl groups bound to the surface of the inorganic filler.

(Outer Semi-Conductive Layer)

The outer semi-conductive layer 140 is provided so as to cover the outer circumference of the insulating layer 130. The outer semi-conductive layer 140 is semi-conductive, and is configured to keep an electric field from concentrating between the insulating layer 130 and the shielding layer 150. The outer semi-conductive layer 140 is formed of a material similar to the material of the inner semi-conductive layer 120, for example.

(Shielding Layer)

The shielding layer 150 is provided so as to cover the outer circumference of the outer semi-conductive layer 140. The shielding layer 150 is formed by winding a copper tape or formed as a wire shield by winding a plurality of annealed copper wires or the like, for example. Note that a tape made of a rubberized cloth or the like may be wound around the inner side or the outer side of the shielding layer 150.

(Sheath)

The sheath 160 is provided so as to cover the outer circumference of the shielding layer 150. The sheath 160 is formed of polyvinyl chloride or polyethylene, for example.

(DC Characteristics)

In the DC power cable 10 configured as described above, the inorganic filler added to the insulating layer 130 has high adhesiveness to the base resin, and therefore, DC characteristics described below can be obtained, for example.

The following characteristics can be obtained as DC characteristics of the DC power cable 10 in the initial state before a temperature change.

In the present embodiment, a volume resistivity of a sheet of the insulating layer 130 measured at a temperature of 90° C. by applying a DC electric field of 80 kV/mm is $4 \times 10^{15}$ $\Omega \cdot cm$ or more, for example, and preferably $5 \times 10^{15}$ $\Omega \cdot cm$ or more. Note that the sheet of the insulating layer 130 has a thickness of 0.15 mm.

In the present embodiment, a dielectric breakdown field strength measured for a sheet of the insulating layer 130 at a temperature of 90° C. is 250 kV/mm or more, for example, and preferably 300 kV/mm or more. Note that the sheet of the insulating layer 130 has a thickness of 0.15 mm.

In the present embodiment, a field enhancement factor FEF calculated using the following expression (4) when a DC electric field of 50 kV/mm is applied to a sheet of the insulating layer 130 at a temperature of 30° C. under atmospheric pressure is less than 1.15, for example.

$$FEF = E_1/(V_0/T) \qquad (4)$$

$V_0$ represents a voltage applied to the sheet of the insulating layer 130 expressed in the unit of kV, T represents the thickness of the sheet of the insulating layer 130, which is 0.15 mm, and $E_1$ represents the maximum electric field in the sheet of the insulating layer 130 expressed in the unit of kV/mm.

Also, the following characteristics can be obtained as DC characteristics of the DC power cable 10 after the predetermined heat cycle.

In the heat cycle test, a heat cycle including a step of holding the DC power cable 10 at a temperature of −10° C. for 8 hours and a step of holding the DC power cable 10 at room temperature (24° C.) for 16 hours is repeated for 3 months. In the present embodiment, when a DC electric field of 200 kV/mm is applied in the thickness direction of the insulating layer 130 at a temperature of 90° C. after the heat cycle test, the time it takes until a dielectric breakdown occurs in the insulating layer 130 is 1 hour or longer, for example, and preferably 2 hours or longer.

(Specific Dimensions Etc.)

Although there is no particular limitation on specific dimensions of the DC power cable 10, for example, the diameter of the conductor 110 is 5 mm or more and 60 mm or less, the thickness of the inner semi-conductive layer 120 is 1 mm or more and 3 mm or less, the thickness of the insulating layer 130 is 1 mm or more and 35 mm or less, the thickness of the outer semi-conductive layer 140 is 1 mm or more and 3 mm or less, the thickness of the shielding layer 150 is 1 mm or more and 5 mm or less, and the thickness of the sheath 160 is 1 mm or more. A DC voltage applied to the DC power cable 10 in the present embodiment is 20 kV or more, for example.

(3) Method for Manufacturing DC Power Cable

Next, the following describes a method for manufacturing the DC power cable according to the present embodiment. In the following description, step is abbreviated as "S".

(S100: Resin Composition Preparation Step)

First, a resin composition that contains a base resin including a polyolefin and an inorganic filler including silicon dioxide is prepared. This resin composition preparation step S100 includes a surface treatment step S120 and a mixing step S140, for example.

(S120: Surface Treatment Step)

First, at least a portion of the inorganic filler is surface-treated with a silane coupling agent. In the present embodiment, the surface treatment step S120 is performed using a dry method, for example.

First, a solution is prepared by diluting the silane coupling agent with an organic solvent. After the solution is prepared, the inorganic filler is loaded into a stirring apparatus. The stirring apparatus is a Henschel mixer, for example.

After the inorganic filler is loaded into the stirring apparatus, the solution containing the silane coupling agent is dripped into the stirring apparatus or sprayed using a spray while stirring the inorganic filler within the stirring apparatus. Thus, at least a portion of the inorganic filler is surface-treated with the silane coupling agent.

At this time, in the surface treatment step S120 according to the present embodiment, the inorganic filler is surface-treated in such a manner that the requirements for the adhesiveness of the inorganic filler are satisfied, for example. That is, the inorganic filler is surface-treated in such a manner that the remaining rate R of the inorganic filler in a fractured frozen surface after production of the DC power cable 10 is 50% or more, or the brightness V of a folded cross section of the insulating layer 130 after production of the DC power cable 10 satisfies the expression (2).

Specifically, in the surface treatment step S120 according to the present embodiment, the moisture content (absolute humidity, the mass of moisture per unit volume) in an atmosphere in which the inorganic filler is surface-treated is set to 0.1 g/m³ or less, for example. If the moisture content in the atmosphere is higher than 0.1 g/m³, molecules of the silane coupling agent may bind together in the atmosphere. Therefore, the coverage rate of the silane coupling agent to the inorganic filler may decrease. In contrast, it is possible to keep molecules of the silane coupling agent from binding together in the atmosphere according to the present embodiment by setting the moisture content in the atmosphere to 0.1 g/m³ or less. Thus, it is possible to suppress a reduction in the coverage rate of the silane coupling agent to the inorganic filler.

The lower limit of the moisture content in the atmosphere is not particularly limited. However, in the surface treatment step S120, it is necessary to hydrolyze hydrolyzable groups (alkoxy groups or the like) of the silane coupling agent, and bind the hydrolyzed silane coupling agent to the surface of the inorganic filler having a polarity. Therefore, from the viewpoint of hydrolyzing a predetermined amount of the silane coupling agent, the moisture content in the atmosphere is preferably 0.0001 g/m³ or more, for example.

The moisture content in the atmosphere can be adjusted so as to fall within the above range by using the following methods, for example. For example, dry air whose moisture content has been reduced is supplied into the stirring apparatus to adjust the moisture content inside the stirring apparatus. Alternatively, a dehydration tower is connected to the stirring apparatus and the atmosphere inside the stirring apparatus is circulated through the dehydration tower to adjust the moisture content inside the stirring apparatus.

Also, in the surface treatment step S120 according to the present embodiment, the inorganic filler having a (initial) moisture content of 3 wt % or less is used, for example. If the moisture content in the inorganic filler is more than 3 wt %, the inorganic filler may agglomerate during the surface treatment step S120. In contrast, it is possible to suppress agglomeration of the inorganic filler during the surface treatment step S120 according to the present embodiment by setting the moisture content in the inorganic filler to 3 wt % or less. For this reason as well, it is possible to suppress a reduction in the coverage rate of the silane coupling agent to the inorganic filler.

Although the lower limit of the moisture content in the inorganic filler is not particularly limited, the lower limit is 0.001 wt %, for example, from the viewpoint of stably manufacturing the inorganic filler.

Here, the inorganic filler having a moisture content of 3 wt % or less can be obtained as follows, for example.

A firing step (sintering step) is performed as a final step when any of the above-described methods is used to form the inorganic filler, for example. The moisture content in the inorganic filler is 3 wt % or less immediately after the firing step. In the present embodiment, the inorganic filler is sealed and stored in an inert gas atmosphere after the firing step of the inorganic filler to keep the inorganic filler from absorbing moisture.

Thus, the moisture content in the inorganic filler used in the surface treatment step S120 can be adjusted to 3 wt % or less.

On the other hand, when a predetermined period has elapsed from the firing step of the inorganic filler and the moisture content in the prepared inorganic filler has increased, the inorganic filler may be preliminary dried before the surface treatment step S120 to reduce the moisture content to 3 wt % or less. The inorganic filler may be preliminary dried by being heated in an inert gas atmosphere, for example. The inorganic filler may be heated using an oven or microwave, for example. When heating the inorganic filler, it is also possible to perform cycle purging including a step of purging the atmosphere with inert gas and a step of making a vacuum.

Also, in the surface treatment step S120 according to the present embodiment, a solution obtained by diluting the silane coupling agent with an organic solvent having a water concentration of 7 vol % or less is used, for example. If the water concentration in the organic solvent used for dilution is more than 7 vol %, molecules of the silane coupling agent may bind together in the solution when the silane coupling agent is diluted with the organic solvent. In contrast, it is possible to keep molecules of the silane coupling agent from binding together in the solution when the silane coupling agent is diluted with the organic solvent according to the present embodiment by setting the water concentration in the organic solvent used for dilution to 7 vol % or less. Thus, it is possible to suppress a reduction in the coverage rate of the silane coupling agent to the inorganic filler in the surface treatment step S120.

Although the lower limit of the water concentration in the organic solvent is not particularly limited, the lower limit is 0.001 vol %, for example, from the viewpoint of stably purifying the organic solvent.

The organic solvent used to dilute the silane coupling agent is not particularly limited, and examples thereof include methanol, ethanol, isopropyl alcohol, and n-propyl alcohol. Note that two or more of these may be used in combination.

Other conditions in the surface treatment step S120 according to the present embodiment are not particularly limited, but are set as follows, for example.

The treatment temperature in the surface treatment step S120 according to the present embodiment is set to normal temperature (i.e., the surface treatment step is performed without heating), for example. Specifically, the treatment temperature in the surface treatment step S120 is set to 15° C. or higher and 25° C. or lower, for example.

After the surface treatment step S120 is completed, the surface-treated inorganic filler is dried as appropriate. Although there is no particular limitation on the drying method, the inorganic filler is dried in a vacuum, for example.

Furthermore, the mean volume diameter of the inorganic filler may be adjusted by performing a predetermined pulverizing processing.

A final mean volume diameter of the inorganic filler is set to 1 m or less, for example, preferably 700 nm or less, and more preferably 100 nm or less.

(S140: Mixing Step)

The base resin including polyethylene, the inorganic filler including silicon dioxide, a crosslinking agent constituted by an organic peroxide, and other additives (an antioxidant, a lubricant, etc.) are mixed (kneaded) using a mixer such as a Banbury mixer or a kneader to obtain a mixed material. After the mixed material is obtained, the mixed material is granulated using an extruder. Thus, pellets of the resin composition to be used to form the insulating layer 130 are formed. Note that mixing and granulation may be performed together using a twin-screw type extruder having a high kneading effect.

(S200: Conductor Preparation Step)

On the other hand, the conductor 110 formed by twisting a plurality of conductor core wires is prepared.

(S300: Cable Core Formation Step (Extrusion Step))

Next, a resin composition for the inner semi-conductive layer, which is obtained by mixing an ethylene-ethyl acrylate copolymer and conductive carbon black in advance, for example, is loaded into an extruder A for forming the inner semi-conductive layer 120, which is included in a three-layer simultaneous extruder.

The pellets of the resin composition described above are loaded into an extruder B for forming the insulating layer 130.

A resin composition for the outer semi-conductive layer, which is constituted by materials similar to the materials of the resin composition for the inner semi-conductive layer loaded into the extruder A, is loaded into an extruder C for forming the outer semi-conductive layer 140.

Next, the materials respectively extruded from the extruders A to C are guided to a common head to simultaneously extrude the inner semi-conductive layer 120, the insulating layer 130, and the outer semi-conductive layer 140 arranged in this order from the inside toward the outside on the outer circumference of the conductor 110. Thereafter, the insulating layer 130 is crosslinked by being heated with radiant heat from an infrared heater inside a crosslinking tube pressurized with nitrogen gas or the like, or heated with heat conducted from a heating medium such as nitrogen gas or silicone oil having a high temperature. Thus, a cable core constituted by the conductor 110, the inner semi-conductive layer 120, the insulating layer 130, and the outer semi-conductive layer 140 is formed.

(S400: Shielding Layer Formation Step)

Next, the shielding layer 150 is formed on the outer side of the outer semi-conductive layer 140 by winding a copper tape, for example.

(S500: Sheath Formation Step)

Next, the sheath 160 is formed on the outer circumference of the shielding layer 150 by loading vinyl chloride into an extruder and extruding it.

Through the above steps, the DC power cable 10, which is a solid insulation DC power cable, is manufactured.

(4) Effects of the Present Embodiment

One or more of the following effects can be obtained according to the present embodiment.

(a) In the present embodiment, the DC power cable 10 is manufactured using the manufacturing method described above, and thus it is possible to stably improve adhesiveness of the inorganic filler added to the insulating layer 130 with respect to the base resin, and maintain the adhesiveness over time. Specifically, the remaining rate R of the inorganic filler in a fractured frozen surface is 50% or more. That is, even when the temperature is changed to the very low temperature of liquid nitrogen, it is possible to maintain the state where the inorganic filler strongly adheres to the base resin according to the present embodiment.

Also, in the present embodiment, adhesiveness of the inorganic filler to the base resin is improved, and therefore, whitening of a folded cross section of the insulating layer 130 can be suppressed, and the folded cross section of the insulating layer 130 can have a brightness V lower than (2.5N+67.5)%. That is, even when bending stress large enough to completely fold the insulating layer 130 by 180° is applied to the insulating layer 130, it is possible to suppress separation of the inorganic filler from the base resin and formation of a gap between the base resin and the inorganic filler according to the present embodiment.

Since adhesiveness of the inorganic filler to the base resin is improved and the adhesiveness is maintained over time as described above, it is possible to suppress separation of the inorganic filler from the base resin due to thermal stress generated through thermal expansion and contraction of the insulating layer 130 even when a temperature change width in the installation environment of the DC power cable 10 is large and thermal expansion and contraction of the insulating layer 130 occurs. Also, even when a temperature change occurs for along period of time and the influence of thermal stress accumulates in the insulating layer 130, it is possible to suppress separation of the inorganic filler from the base resin due to accumulation of the influence of thermal stress. By suppressing separation of the inorganic filler as described above, it is possible to suppress formation of a gap between the base resin and the inorganic filler. Accordingly, a local reduction in insulating properties of the insulating layer can be suppressed, and a reduction in space charge trapping ability of the inorganic filler can be suppressed. Consequently, deterioration of DC characteristics of the DC power cable 10 due to a temperature change can be suppressed.

(b) When the remaining rate R of the inorganic filler in a fractured frozen surface is 50% or more, or the brightness V of a folded cross section of the insulating layer 130 satisfies the expression (2) as described above, adhesiveness of the inorganic filler to the base resin is high before a temperature change as well. Therefore, space charge generated in the insulating layer 130 can be sufficiently trapped by the inorganic filler, and local accumulation of the space charge in the insulating layer 130 can be suppressed. Consequently, DC characteristics of the DC power cable 10 in the initial state before a temperature change can be improved.

(c) The inorganic filler is surface-treated in the surface treatment step S120 in such a manner that the remaining rate R of the inorganic filler in a fractured frozen surface becomes 50% or more or the brightness V of a folded cross section of the insulating layer 130 satisfies the expression (2). Therefore, even when a temperature change width in the installation environment of the DC power cable is large or a temperature change occurs for a long period of time, adhesiveness of the inorganic filler to the base resin can be maintained.

Consequently, deterioration of DC characteristics of the DC power cable due to a temperature change can be suppressed.

(d) The moisture content in the atmosphere in which the inorganic filler is surface-treated in the surface treatment step S120 is 0.1 g/m$^3$ or less, and therefore, molecules of the silane coupling agent can be kept from binding together in the atmosphere. By keeping molecules of the silane coupling agent from binding together in the atmosphere, it is possible to suppress a reduction in the density of the silane coupling agent in the atmosphere and a reduction in the coverage rate of the silane coupling agent to the inorganic filler.

Also, it is possible to suppress moisture absorption by the inorganic filler by setting the moisture content in the atmosphere in which the inorganic filler is surface-treated to 0.1 g/m$^3$ or less. By suppressing moisture absorption by the inorganic filler, it is possible to suppress agglomeration of the inorganic filler during the surface treatment step S120. As a result of agglomeration of the inorganic filler being suppressed, the entire surface of the inorganic filler (each particle thereof) can be exposed, and the entire surface of the inorganic filler can be surface-treated with the silane coupling agent. For this reason as well, it is possible to suppress a reduction in the coverage rate of the silane coupling agent to the inorganic filler.

As a consequence of the above, it is possible to suppress a reduction in the adhesiveness of the inorganic filler to the base resin.

(e) When an inorganic filler having a moisture content of 3 wt % or less is used in the surface treatment step S120, agglomeration of the organic filler can be suppressed. Particularly in the case where a dry method is used in the surface treatment step S120 as in the present embodiment, it is possible to sufficiently stir particles of the inorganic filler and make agglomeration of the inorganic filler less likely to occur. This makes it possible to suppress a reduction in the coverage rate of the silane coupling agent to the inorganic filler, similarly to the effect of setting the moisture content in the atmosphere to 0.1 g/m$^3$ or less.

(f) The inorganic filler is preferably surface-treated with a silane coupling agent other than monoalkyl silane coupling agents, for example. Although details of the mechanisms are unknown, adhesiveness of the inorganic filler to the base resin can be significantly improved in this case when compared with a case where the inorganic filler is surface-treated with a monoalkyl silane coupling agent. Consequently, deterioration of DC characteristics of the DC power cable 10 due to a temperature change can be significantly suppressed.

(g) Alternatively, the inorganic filler is preferably surface-treated with a silane coupling agent that has a vinyl group at a terminal end, for example. In this case, vinyl groups derived from the vinyl silane coupling agent can be crosslinked with the base resin with use of a predetermined crosslinking agent.

Also, it is possible to improve a coverage rate of the vinyl silane coupling agent to the inorganic filler by setting the moisture content in the atmosphere in which the inorganic filler is surface-treated in the surface treatment step S120 to 0.1 g/m$^3$ or less as described above. Thus, it is possible to increase the number of crosslinking points between the base resin and silyl groups bound to the surface of the inorganic filler when vinyl groups derived from the vinyl silane coupling agent are crosslinked with the base resin.

As described above, adhesiveness of the inorganic filler to the base resin can be significantly improved due to a synergistic effect of the vinyl silane coupling agent and the surface treatment performed in an atmosphere having a low moisture content. Consequently, deterioration of DC characteristics of the DC power cable 10 due to a temperature change can be significantly suppressed.

(h) Alternatively, the inorganic filler is preferably surface-treated with a silane coupling agent that has an amino group, for example. Although details of the mechanisms are unknown, adhesiveness of the inorganic filler to the base resin can be significantly improved in this case when compared with a case where the inorganic filler is surface-treated with a monoalkyl silane coupling agent. Consequently, deterioration of DC characteristics of the DC power cable 10 due to a temperature change can be significantly suppressed.

It is conceivable that adhesiveness of the inorganic filler is significantly improved through surface treatment performed using an amino silane coupling agent due to the following mechanism, for example. For example, when the surface treatment is performed using an amino silane coupling agent, an amino group, which is an active hydrogen group, can be bound to at least a portion of the surface of the inorganic filler. Accordingly, the $NH_2$ group can be reacted with a chemically inactive surface (H– donor) of the polyolefin. Through this reaction, adhesiveness of the inorganic filler to the base resin can be significantly improved. Consequently, deterioration of DC characteristics of the DC power cable 10 due to a temperature change can be significantly suppressed.

Other Embodiments of the Present Disclosure

Although an embodiment of the present disclosure has been specifically described, the present disclosure is not limited to the above embodiment, and various changes can be made within a scope not departing from the gist of the present disclosure.

In the above embodiment, a case where the resin composition contains a base resin including a polyolefin is described, but the resin composition may also contain a copolymer of an olefin and a polar monomer. Examples of the copolymer of an olefin and a polar monomer include an ethylene-ethyl acrylate (ethylene-acrylic acid ethyl) copolymer, an ethylene-methyl acrylate copolymer, an ethylene-butyl acrylate copolymer, an ethylene-methyl methacrylate copolymer, and an ethylene-glycidyl methacrylate copolymer. Two or more of these may be used in combination.

In the above embodiment, the provision that the requirements for the adhesiveness of the inorganic filler are satisfied is described on the premise that the resin composition constituting the insulating layer 130 has been crosslinked, but the provision may also apply to a case where the resin composition constituting the insulating layer 130 has not been crosslinked. However, the provision can be satisfied more reliably in the case where the resin composition constituting the insulating layer 130 has been crosslinked.

EXAMPLES

Next, examples according to the present disclosure will be described. The following examples are mere examples of the present disclosure and the present disclosure is not limited by the following examples.
(1) DC Power Cable Samples
(1-1) Surface Treatment of Inorganic Filler
Silicon dioxide described below was prepared as an inorganic filler. The inorganic filler was preliminary dried to adjust an initial moisture content in the inorganic filler to 0.5 wt %. Also, a silane coupling agent described below was diluted with ethanol having a water content of 1.5 vol %, which was used as an organic solvent for dilution, to prepare a solution to be used for surface treatment. Next, the inorganic filler was loaded into a stirring apparatus and stirred in a state where the moisture content in an atmosphere within the stirring apparatus was adjusted to a value shown below. The solution to be used for surface treatment was added into the stirring apparatus while the inorganic filler was stirred in the stirring apparatus. Thus, surface treatment was performed on the inorganic filler using a dry method. Note that the treatment temperature was set to normal temperature (24° C.). Details of the conditions were as follows.

Inorganic filler: silicon dioxide (fumed silica, shown as "Nano silica" in Table 1) (mean volume diameter X: 12 nm)

Silane coupling agent: vinyltrimethoxysilane (VTMS), vinyltriethoxysilane (VTES), methyltrimethoxysilane (C1), octyltriethoxysilane (C8), octadecyltriethoxysilane (C18), 3-aminopropyltrimethoxysilane (APTMS)

Organic solvent for dilution: ethanol (water concentration: 1.5 vol %)

Surface treatment method: dry method (Initial) moisture content in inorganic filler: 0.5 wt %

Moisture content in atmosphere: 0.01 to 10 $g/m^3$ (1-2) Production of Resin Composition The following materials were mixed using a Banbury mixer and granulated using an extruder to produce pellets of a resin composition.
(Base Resin)
Low-density polyethylene (LDPE) (density d=0.920 $g/cm^3$, MFR=1 g/10 min)
100 parts by mass
(Inorganic Filler)
Nano silica subjected to the above-described surface treatment, content N: 1 to 2 parts by mass
(Crosslinking Agent)
2,5-dimethyl-2,5-d$_i$(t-butylperoxy)hexane, 1.3 parts by mass
(Other Additives)
Lubricant: oleic acid amide, predetermined amount
Antioxidant: 4,4'-thiobis(3-methyl-6-t-butylphenol), predetermined amount
(1-3) Production of DC Power Cable Samples Next, a conductor formed by twisting conductor core wires having a diameter of 14 mm and made of a dilute copper alloy was prepared. After the conductor was prepared, a resin composition for an inner semi-conductive layer containing an ethylene-ethyl acrylate copolymer, the resin composition for an insulating layer prepared as described above in (1-2), and a resin composition for an outer semi-conductive layer constituted by a material similar to the material of the resin composition for an inner semi-conductive layer were loaded into extruders A to C, respectively. The materials respectively extruded from the extruders A to C were guided to a common head to simultaneously extrude an inner semi-conductive layer, an insulating layer, and an outer semi-conductive layer arranged in this order from the inside toward the outside on the outer circumference of the conductor. At this time, the thickness of the inner semi-conductive layer was set to 1 mm, the thickness of the insulating layer was set to 3 mm, and the thickness of the outer semi-conductive layer was set to 1 mm. Thereafter, the extrusion-molded product was heated at about 250° C. to crosslink the resin composition for the insulating layer. Thus, a DC power cable sample including the conductor, the inner semi-conductive layer, the insulating layer, and the outer semi-conductive layer from the center toward the outer circumference was produced.

Through the above steps, DC power cable samples A1 to A9, B1, and B2 were produced using different resin compositions.

(2) Evaluation

The following evaluation was performed on each of the DC power cable samples A1 to A9, B1, and B2.

(2-1) Evaluation of Remaining Rate
[Sample Processing]

Each of the DC power cable samples A1 to A9, B1, and B2 was rotary sliced from the outer circumferential surface to obtain a sheet of the insulating layer with a thickness of 1 mm from a center portion of the insulating layer in the thickness direction. At this time, a plurality of sheets were obtained in a single turn.

(i) Density Before the Sheet was Frozen and Fractured
[Cut Surface Processing]

A sheet of the insulating layer was cut at 24° C. using a focused ion beam without being frozen. At this time, gallium ions were used, an acceleration voltage was set to 30 kV, and a current value was set to 60 nA.

[Evaluation of Density of Inorganic Filler]

A cut surface of the sheet processed as described above was observed using a scanning electron microscope (SEM). At this time, the density of the inorganic filler in the cut surface was measured. At this time, the size of a field of view of the cut surface was set to 15 µm×10 µm, the density of the inorganic filler in the cut surface was measured at 10 arbitrarily selected positions, and the average of the measured values was calculated. The thus obtained density was taken as the "density Dc of the inorganic filler in a cut surface" described above.

(ii) Density after the Sheet was Frozen and Fractured
[Formation of Fractured Frozen Surface]

A sheet of the insulating layer described above was frozen by being immersed in liquid nitrogen for 1 hour. Thereafter, the sheet was fractured by being bent.

[Evaluation of Density of Inorganic Filler]

A fractured surface (fractured frozen surface) of the sheet fractured as described above was observed using a SEM. At this time, the density of the inorganic filler remaining in the fractured frozen surface was measured under the same conditions as those under which the density in the cut surface was measured as described above. That is, the size of a field of view of the fractured frozen surface was set to 15 µm×10 µm, the density of the inorganic filler remaining in the fractured frozen surface was measured at 10 arbitrarily selected positions, and the average of the measured values was calculated. The thus obtained density was taken as the "density Df of the inorganic filler in a fractured frozen surface" described above.

(iii) Evaluation of Remaining Rate

A remaining rate R of the inorganic filler in the fractured frozen surface was calculated by substituting Dc and Df obtained as described above in (i) and (ii) into the expression (1) shown above. As a result of the calculation, when the remaining rate R of the inorganic filler in the fractured frozen surface was lower than 50%, the remaining rate was evaluated as "poor", when the remaining rate R was 50% or higher, the remaining rate was evaluated as "good", and when the remaining rate R was 60% or higher, the remaining rate was evaluated as "excellent". Note that the requirement that the remaining rate R is good or excellent in experiments described below will also be referred to as the "requirement for the remaining rate of the inorganic filler".

(2-2) Evaluation of Whitening of Insulating Layer
[Sample Processing]

Each of the DC power cable samples A1 to A9, B1, and B2 was rotary sliced from the outer circumferential surface to obtain a sheet of the insulating layer with a thickness of 2 mm, a width of 200 mm, and a length of 30 mm from a center portion of the insulating layer in the thickness direction.

[Measurement of Brightness V in Folded Cross Section of Sheet]

The sheet of the insulating layer was folded by 180° at 24° C., and a cross section of the folded portion of the sheet was observed (imaged) using an optical microscope. Histogram analysis was performed on the obtained cross-sectional image using image analysis software to measure the brightness V in a HSV color space. Note that the unit of the brightness V is %. The center of the folded cross section of the sheet was observed.

At this time, observation conditions were set in such a manner as to satisfy the following two points. The observation conditions were set in such a manner that, when a sheet of an insulating layer that did not contain MAH-PE and the inorganic filler (other materials were the same as those of a sample for comparison) was folded under the same conditions as those under which the sample for comparison was folded and a folded cross section of the sheet was observed, the brightness V of the cross section was 50%. Also, the observation conditions were set in such a manner that, when a sheet of an insulating layer that did not contain MAH-PE and contained 5 parts by mass of the inorganic filler that had not been surface-treated (other materials were the same as those of the sample for comparison) was folded under the same conditions as those under which the sample for comparison was folded and a folded cross section of the sheet was observed, the brightness V of the cross section was 80%.

At this time, the size of a field of view of the folded cross section of the sheet was set to 10 mm×5 mm, the brightness V of the cross section was measured at 10 arbitrarily selected positions, and the average of the measured values was calculated.

As a result of the measurement, when the expression: V<2.5N+67.5 was satisfied (i.e., the expression (2) was satisfied), the brightness was evaluated as "good", and when the expression: V<5N+55 was satisfied (i.e., the expression (3) was satisfied), the brightness was evaluated as "excellent". Note that this requirement in the experiments described below will also be referred to as the "requirement for the brightness of a folded cross section".

(2-3) Evaluation of Initial DC Characteristics
[Sample Processing]

Each of the DC power cable samples A1 to A9, B1, and B2 was rotary sliced from the outer circumferential surface to obtain a sheet of the insulating layer with a thickness of 0.15 mm.

[Volume Resistivity]

The sheet of the insulating layer was immersed in silicone oil having a temperature of 90° C., and a DC electric field of 80 kV/mm was applied to the sheet of the insulating layer using flat plate electrodes having a diameter of 25 mm to measure the volume resistivity. When the volume resistivity was $4 \times 10^{15}$ Ω·cm or more, the volume resistivity was evaluated as good.

[DC Breakdown Field Strength]

The sheet of the insulating layer was immersed in silicone oil having a temperature of 90° C., and an applied voltage was increased at a rate of 4 kV/min using flat plate electrodes having a diameter of 25 mm. A voltage applied when a dielectric breakdown occurred in the sheet of the insulating layer was divided by the thickness of the sheet to obtain a DC breakdown field strength of the sheet of the insulating layer. When the DC breakdown field strength was 250 kV/mm or more, the DC breakdown field strength was evaluated as good.

[Space Charge Characteristics]

Space charge characteristics of the sheet of the insulating layer were evaluated using a space charge measurement apparatus (manufactured by Five Lab Co., Ltd.) using a pulsed electro-acoustic method (PEA method). Specifically, a DC electric field of 50 kV/mm was continuously applied to the sheet of the insulating layer for 1 hour at a temperature of 30° C. under atmospheric pressure, and a maximum electric field in the sheet was measured. At this time, a field enhancement factor FEF was calculated using the expression (4) shown above. When the field enhancement factor FEF was less than 1.15, the space charge characteristics were evaluated as A (good), and when the FEF was 1.15 or more, the space charge characteristics were evaluated as B (poor).

(2-4) Evaluation of DC Characteristics after Heat Cycle

[Heat Cycle Test]

Each of the DC power cable samples A1 to A9, B1, and B2 was placed in a low-temperature thermostatic chamber, and subjected to a heat cycle test in which a heat cycle including a step of holding the DC power cable at a temperature of −10° C. for 8 hours and a step of holding the DC power cable at room temperature (24° C.) for 16 hours was repeated for 3 months.

[DC Breakdown Test]

After the heat cycle test, the DC power cable was immersed in silicone oil having a temperature of 90° C., and a DC electric field of 200 kV/mm was applied in the thickness direction of the insulating layer. At this time, when the time it took until a dielectric breakdown occurred in the insulating layer (hereinafter also referred to as a "dielectric breakdown time") was 2 hours or longer, the DC characteristics after the heat cycle were evaluated as A (excellent), when the dielectric breakdown time was 1 hour or longer and shorter than 2 hours, the DC characteristics after the heat cycle were evaluated as B (good), and when the dielectric breakdown time was shorter than 1 hour, the DC characteristics after the heat cycle were evaluated as C (poor).

(3) Results

Evaluation results of the DC power cable samples are shown in Table 1 below. In Table 1, the unit of the content of each material is "parts by mass".

TABLE 1

| Sample | | A1 | A2 | A3 | A4 | A5 | A6 |
|---|---|---|---|---|---|---|---|
| LDPE | | 100 | | | | | |
| Inorganic filler | Type (mean volume diameter X) | Nano silica (12 nm) | | | | | |
| | Content N | 1 | | | 2 | 1 | |
| Silane coupling agent | | VTMS | | | | C1 | C8 |
| Moisture content (g/m³) in surface treatment | | 0.01 | 0.05 | 0.1 | | 0.01 | |
| Remaining rate R (%) of inorganic filler in fractured frozen surface | | 93 | 82 | 71 | 92 | 58 | 56 |
| Brightness V (%) of folded cross section of insulating layer | | 54.5 | 54.9 | 55.4 | 59.5 | 61.5 | 62.4 |
| Volume resistivity (Ω · cm) | | $2 \times 10^{16}$ | $1 \times 10^{16}$ | $8 \times 10^{15}$ | $3 \times 10^{16}$ | $9 \times 10^{15}$ | $6 \times 10^{15}$ |
| DC breakdown field strength (kV/mm) | | 340 | 335 | 325 | 355 | 325 | 320 |
| Space charge characteristics (A and B) | | A | A | A | A | A | A |
| DC breakdown test after heat cycle (A to C) | | A | A | A | A | B | B |

| Sample | | A7 | A8 | A9 | B1 | B2 |
|---|---|---|---|---|---|---|
| LDPE | | 100 | | | 100 | |
| Inorganic filler | Type (mean volume diameter X) | Nano silica (12 nm) | | | Nano silica (12 nm) | |
| | Content N | 1 | | | 1 | |
| Silane coupling agent | | C18 | VTES | APTMS | VTMS | |
| Moisture content (g/m³) in surface treatment | | | 0.01 | | 10 | 1 |
| Remaining rate R (%) of inorganic filler in fractured frozen surface | | 53 | 91 | 94 | 38 | 44 |
| Brightness V (%) of folded cross section of insulating layer | | 64.8 | 54.8 | 54.3 | 79.2 | 71.3 |
| Volume resistivity (Ω · cm) | | $5 \times 10^{15}$ | $1 \times 10^{16}$ | $2 \times 10^{16}$ | $4 \times 10^{13}$ | $4 \times 10^{15}$ |
| DC breakdown field strength (kV/mm) | | 310 | 335 | 345 | 220 | 260 |
| Space charge characteristics (A and B) | | A | A | A | B | A |
| DC breakdown test after heat cycle (A to C) | | B | A | A | C | C |

VTMS: vinyltrimethoxysilane
C1: methyltrimethoxysilane,
C8: octyltriethoxysilane,
C18: octadecyltriethoxysilane
VTES: vinyltriethoxysilane,
APTMS: 3-aminopropyltrimethoxysilane (Dependency on Moisture Content in Surface Treatment)

[Samples B1 and B2]

In the samples B1 and B2 for which the moisture content in the atmosphere of the surface treatment step was more than $0.1 \text{ g/m}^3$, the remaining rate R of the inorganic filler in the fractured frozen surface was lower than 50%, that is, the samples did not satisfy the requirement for the remaining rate of the inorganic filler. Also, in the samples B1-1 and B1-2, the brightness was in the range of: $V \geq 2.5N+67.5$, that is, the samples did not satisfy the requirement for the brightness of the folded cross section.

The moisture content in the atmosphere of the surface treatment step was high in the production of the samples B1 and B2, and therefore, molecules of the silane coupling agent may have bound together in the atmosphere. Alternatively, the inorganic filler may have absorbed moisture and agglomerated during the surface treatment step because the moisture content in the atmosphere of the surface treatment step was high in the production of the samples B1 and B2. It appears that the coverage rate of the silane coupling agent to the inorganic filler decreased for these reasons. It appears that this resulted in a reduction in the adhesiveness of the inorganic filler to the base resin in the samples B1 and B2.

As for the initial DC characteristics (the volume resistivity, the DC breakdown field strength, and the space charge characteristics), results of the sample B2 were good, but results of the sample B1 were not good. In the sample B1, adhesiveness of the inorganic filler to the base resin was very low, and accordingly, local accumulation of space charge may have occurred in the insulating layer. Consequently, it appears that the initial DC characteristics of the sample B1 were not good.

As for results of the DC breakdown test after the heat cycle, results of both samples B1 and B2 were not good. Particularly in the case of the sample B2, it was found that the initial DC characteristics were good but a dielectric breakdown occurred in a short time in the DC breakdown test after the heat cycle.

According to the above results, adhesiveness of the inorganic filler to the base resin was low in the samples B1 and B2, and the adhesiveness could not be maintained over time. Therefore, the inorganic filler separated from the base resin due to thermal stress generated in the heat cycle or accumulation of the influence of the thermal stress. As a result of separation of the inorganic filler, insulating properties of the sheet of the insulating layer may have locally deteriorated. It appears that therefore, the dielectric breakdown time was short in the DC breakdown test carried out on the samples B1 and B2 after the heat cycle.

[Samples A1 to A9]

In the samples A1 to A9 for which the moisture content in the atmosphere of the surface treatment step was $0.1 \text{ g/m}^3$ or less, the remaining rate R of the inorganic filler in the fractured frozen surface was 50% or more, that is, the samples satisfied the requirement for the remaining rate of the inorganic filler. Also, in the samples A1 to A9, the brightness was in the range of $V<2.5N+67.5$, that is, the samples satisfied the requirement for the brightness of the folded cross section.

The moisture content in the atmosphere of the surface treatment step was low in the production of the samples A1 to A9, and therefore, molecules of the silane coupling agent were kept from binding together in the atmosphere. Alternatively, moisture absorption by the inorganic filler was suppressed and agglomeration of the inorganic filler during the surface treatment step was suppressed, because the moisture content in the atmosphere of the surface treatment step was low in the production of the samples A1 to A9. For these reasons, a reduction in the coverage rate of the silane coupling agent to the inorganic filler was suppressed. It was confirmed that, consequently, a reduction in the adhesiveness of the inorganic filler to the base resin was suppressed in the samples A1 to A9.

Also, the initial DC characteristics (the volume resistivity, the DC breakdown field strength, and the space charge characteristics) of the samples A1 to A9 were good. In the samples A1 to A9, adhesiveness of the inorganic filler to the base resin was improved, and accordingly, local accumulation of space charge in the insulating layer was suppressed. It was confirmed that, consequently, the samples A1 to A9 had good initial DC characteristics.

Also, results of the samples A1 to A9 in the DC breakdown test after the heat cycle were good. In the samples A1 to A9, adhesiveness of the inorganic filler to the base resin was improved, and the adhesiveness was maintained overtime. Therefore, the inorganic filler could be kept from separating from the base resin due to thermal stress generated during the heat cycle or accumulation of the influence of the thermal stress. Since separation of the inorganic filler was suppressed, a local reduction in insulating properties of the insulating layer was suppressed. It was confirmed that, therefore, the dielectric breakdown time was long in the DC breakdown test carried out on the samples A1 to A9 after the heat cycle.

Also, all of the samples A1 to A3 for which the moisture content in the atmosphere of the surface treatment step was changed within the range of $0.1 \text{ g/m}^3$ or less satisfied the requirement for the remaining rate of the inorganic filler and the requirement for the brightness of the folded cross section, and the samples had good initial DC characteristics and obtained good results in the DC breakdown test after the heat cycle. From these results, it was confirmed that the effect of improving adhesiveness of the inorganic filler and the effect of improving insulating properties can be obtained stably even when the moisture content in the atmosphere of the surface treatment step is changed within the range of $0.1 \text{ g/m}^3$ or less.

(Dependency on Content of Inorganic Filler)

Both samples A1 and A4 for which the content N of the inorganic filler was changed satisfied the requirement for the remaining rate of the inorganic filler. Also, the samples A1 and A4 satisfied the requirement for the brightness of the folded cross section ($V<2.5N+67.5$), in which the content N is used as a variable. Both sample A1 and A4 had good initial DC characteristics and obtained good results in the DC breakdown test after the heat cycle.

Note that it was confirmed that good initial DC characteristics and good results in the DC breakdown test after the heat cycle were obtained in samples for which the content N of the inorganic filler was set to 0.1 parts by mass or 5 parts by mass and the other conditions were set to be the same as the conditions under which the sample A1 was produced, although this is not shown in Table 1.

From the above results, it was confirmed that the effect of improving adhesiveness of the inorganic filler and the effect of improving insulating properties can be obtained stably irrespective of the content N of the inorganic filler by setting the moisture content in the atmosphere of the surface treatment step to $0.1 \text{ g/m}^3$ or less.

(Dependency on Organic Substituent in Silane Coupling Agent)

The samples A5 to A7 produced using monoalkyl silane coupling agents satisfied the requirement for the remaining rate of the inorganic filler, that is, the remaining rate R of the inorganic filler in the fractured frozen surface was 50% or more, but the remaining rate R was less than 60%. Also, the samples A5 to A7 satisfied the requirement for the brightness of the folded cross section, that is, the brightness V satisfied the expression: V<2.5N+67.5, but the brightness V was within the range of: V≥5N+55. In the DC breakdown test carried out on the samples A5 to A7 after the heat cycle, the samples obtained good results compared with the samples B1 and B2, but the dielectric breakdown time was shorter than 2 hours.

In contrast, in the samples A1, A8, and A9 produced using silane coupling agents other than monoalkyl silane coupling agents, the remaining rate R of the inorganic filler in the fractured frozen surface was 60% or more and the brightness V was within the range of: V<5N+55. In the DC breakdown test carried out on the samples A1, A8, and A9 after the heat cycle, the dielectric breakdown time was 2 hours or longer.

From the above results, it was confirmed that adhesiveness of the inorganic filler to the base resin was significantly improved with use of the silane coupling agents other than monoalkyl silane coupling agents. In particular, adhesiveness of the inorganic filler to the base resin was significantly improved in the samples A1 and A8 due to a synergistic effect of vinyl silane coupling agents and the surface treatment performed in an atmosphere having a low moisture content. Also, in particular, adhesiveness of the inorganic filler to the base resin was significantly improved in the sample A9 through a reaction between $NH_2$ groups and a chemically inactive surface (H– donor) of the polyolefin. It was confirmed that, consequently, a significant effect of improving insulating properties was obtained in the samples A1, A8, and A9.

(Dependency on Hydrolyzable Group in Silane Coupling Agent)

The samples A1 and A8 produced using silane coupling agents having mutually different hydrolyzable groups were equivalent in terms of the remaining rate R of the inorganic filler in the fractured frozen surface and the brightness V of the folded cross section. The initial DC characteristics and results of the DC breakdown test after the heat cycle of the samples A1 and A8 were approximately the same. From the above results, it was confirmed that the effect of improving adhesiveness of the inorganic filler and the effect of improving insulating properties can be obtained stably irrespective of the type of hydrolyzable groups included in the silane coupling agent by setting the moisture content in the atmosphere of the surface treatment step to 0.1 $g/m^3$ or less.

(Dependency on Mean Volume Diameter of Inorganic Filler)

Note that samples were produced by setting the mean volume diameter X of the inorganic filler to 1 nm, 50 nm, 500 nm, and 1 μm and setting the other conditions to be the same as the conditions under which the sample A1 was produced, and the samples were evaluated in the same manner as the samples described above, although this is not shown in Table 1. As a result, it was confirmed that good initial DC characteristics and good results in the DC breakdown test after the heat cycle were obtained.

From the results of the sample A1 and the samples used in the supplementary experiment, it was confirmed that the effect of improving adhesiveness of the inorganic filler and the effect of improving insulating properties can be obtained stably irrespective of the mean volume diameter X of the inorganic filler by setting the moisture content in the atmosphere of the surface treatment step to 0.1 $g/m^3$ or less.

Preferable Aspects of the Present Disclosure

Preferable aspects of the present disclosure are supplementary described below.

(Supplementary Note 1)
A resin composition including:
a base resin including a polyolefin; and
an inorganic filler including silicon dioxide and surface-treated with a silane coupling agent,
wherein a remaining rate R of the inorganic filler in a fractured frozen surface is 50% or more,
the remaining rate R being calculated using the following expression (1), $$R=(Df/Dc)\times100 \tag{1}$$

where Df represents a density of the inorganic filler remaining in a fractured surface of a sheet formed of the resin composition containing the base resin and the inorganic filler, when the sheet is immersed in liquid nitrogen for 1 hour and then fractured, and
Dc represents a reference density of the inorganic filler detected in a cut surface of the sheet formed of the resin composition, when the sheet is cut at 24° C. using a focused ion beam without being frozen.

(Supplementary Note 2)
A power cable including:
a conductor; and
an insulating layer provided so as to cover an outer circumference of the conductor,
wherein the insulating layer is constituted by a resin composition containing: a base resin including a polyolefin; and an inorganic filler including silicon dioxide and surface-treated with a silane coupling agent, and
a remaining rate R of the inorganic filler in a fractured frozen surface is 50% or more,
the remaining rate R being calculated using the following expression (1), $$R=(Df/Dc)\times100 \tag{1}$$

where Df represents a density of the inorganic filler remaining in a fractured surface of a sheet formed from the insulating layer, when the sheet is immersed in liquid nitrogen for 1 hour and then fractured, and
Dc represents a reference density of the inorganic filler detected in a cut surface of the sheet formed from the insulating layer, when the sheet is cut at 24° C. using a focused ion beam without being frozen.

(Supplementary Note 3)
The power cable according to Supplementary Note 2, wherein, when a DC electric field of 200 kV/mm is applied in a thickness direction of the insulating layer at a temperature of 90° C. after a predetermined heat cycle test, the time it takes until a dielectric breakdown occurs in the insulating layer is 1 hour or longer,
the heat cycle test being a test in which a cycle including a step of holding the power cable at a temperature of −10° C. for 8 hours and a step of holding the power cable at a temperature of 24° C. for 16 hours is repeated for 3 months.

(Supplementary Note 4)
The power cable according to Supplementary Note 2 or 3, wherein the inorganic filler is surface-treated with a material other than silane coupling agents having three hydrolyzable groups and only one alkyl group per silicon atom, as the silane coupling agent.

(Supplementary Note 5)
The power cable according to Supplementary Note 4, wherein the inorganic filler is surface-treated with at least one material selected from vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, dimethyldimethoxysilane, methoxytrimethylsilane, hexamethyldisilazane, dimethyldichlorosilane, and trimethylchlorosilane, as the silane coupling agent.

(Supplementary Note 6)

The power cable according to any one of Supplementary Notes 2 to 5,
  wherein the inorganic filler is surface-treated with a material having a vinyl group at a terminal end, as the silane coupling agent.

(Supplementary Note 7)

The power cable according to any one of Supplementary Notes 2 to 5,
  wherein the inorganic filler is surface-treated with a material having an amino group, as the silane coupling agent.

(Supplementary Note 8)

The power cable according to any one of Supplementary Notes 4 to 7,
  wherein the remaining rate R is 60% or more.

(Supplementary Note 9)

The power cable according to any one of Supplementary Notes 4 to 8,
  wherein, when a DC electric field of 200 kV/mm is applied in a thickness direction of the insulating layer at a temperature of 90° C. after a predetermined heat cycle test, the time it takes until a dielectric breakdown occurs in the insulating layer is 2 hours or longer,
  the heat cycle test being a test in which a cycle including a step of holding the power cable at a temperature of −10° C. for 8 hours and a step of holding the power cable at a temperature of 24° C. for 16 hours is repeated for 3 months.

(Supplementary Note 10)

A power cable including:
  a conductor; and
  an insulating layer provided so as to cover an outer circumference of the conductor,
  wherein the insulating layer is constituted by a resin composition containing: a base resin including a polyolefin; and an inorganic filler including silicon dioxide and surface-treated with a silane coupling agent,
  a content N of the inorganic filler in the resin composition is 0.1 parts by mass or more and 5 parts by mass or less with respect to 100 parts by mass of the base resin, and
  the following expression (2) is satisfied, $$V < 2.5N + 67.5 \quad (2)$$

where V represents brightness in a HSV color space measured by forming a sheet with a thickness of 2 mm from the insulating layer, folding the sheet at 24° C., and observing a cross section of a folded portion of the sheet, and the unit used to express V is %,
  when a sheet of an insulating layer that does not contain the inorganic filler is folded under the same conditions and a folded cross section of the sheet is observed, V is 50%, and
  when a sheet of an insulating layer containing 5 parts by mass of an inorganic filler that has not been surface-treated is folded under the same conditions and a folded cross section of the sheet is observed, V is 80%.

(Supplementary Note 11)

The power cable according to Supplementary Note 10,
  wherein, when a DC electric field of 200 kV/mm is applied in a thickness direction of the insulating layer at a temperature of 90° C. after a predetermined heat cycle test, the time it takes until a dielectric breakdown occurs in the insulating layer is 1 hour or longer,
  the heat cycle test being a test in which a cycle including a step of holding the power cable at a temperature of −10° C. for 8 hours and a step of holding the power cable at a temperature of 24° C. for 16 hours is repeated for 3 months.

(Supplementary Note 12)

The power cable according to Supplementary Note 10 or 11,
  wherein the inorganic filler is surface-treated with a material other than silane coupling agents having three hydrolyzable groups and only one alkyl group per silicon atom, as the silane coupling agent.

(Supplementary Note 13)

The power cable according to Supplementary Note 12,
  wherein the inorganic filler is surface-treated with at least one material selected from vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, dimethyldimethoxysilane, methoxytrimethylsilane, hexamethyldisilazane, dimethyldichlorosilane, and trimethylchlorosilane as the silane coupling agent.

(Supplementary Note 14)

The power cable according to any one of Supplementary Notes 10 to 13,
  wherein the inorganic filler is surface-treated with a material having a vinyl group at a terminal end, as the silane coupling agent.

(Supplementary Note 15)

The power cable according to any one of Supplementary Notes 10 to 13,
  wherein the inorganic filler is surface-treated with a material having an amino group, as the silane coupling agent.

(Supplementary Note 16)

The power cable according to any one of Supplementary Notes 12 to 15, satisfying the following expression (3), $$V < 5N + 55 \quad (3).$$

(Supplementary Note 17)
The power cable according to any one of Supplementary Notes 12 to 16,
wherein, when a DC electric field of 200 kV/mm is applied in a thickness direction of the insulating layer at a temperature of 90° C. after a predetermined heat cycle test, the time it takes until a dielectric breakdown occurs in the insulating layer is 2 hours or longer,
the heat cycle test being a test in which a cycle including a step of holding the power cable at a temperature of −10° C. for 8 hours and a step of holding the power cable at a temperature of 24° C. for 16 hours is repeated for 3 months.

(Supplementary Note 18)
A method for manufacturing a power cable, including:
a step of preparing a resin composition that contains a base resin including a polyolefin and an inorganic filler including silicon dioxide; and
a step of forming an insulating layer using the resin composition so as to cover an outer circumference of a conductor,
wherein the step of preparing a resin composition includes a step of surface-treating the inorganic filler with a silane coupling agent, and
in the step of surface-treating the inorganic filler, a moisture content in an atmosphere in which the inorganic filler is surface-treated is set to 0.1 $g/m^3$ or less so that a remaining rate R of the inorganic filler in a fractured frozen surface is 50% or more,
the remaining rate R being calculated using the following expression (1), $$R=(Df/Dc)\times 100 \qquad (1)$$

where Df represents a density of the inorganic filler remaining in a fractured surface of a sheet formed from the insulating layer, when the sheet is immersed in liquid nitrogen for 1 hour and then fractured, and
Dc represents a reference density of the inorganic filler detected in a cut surface of the sheet formed from the insulating layer, when the sheet is cut at 24° C. using a focused ion beam without being frozen.

(Supplementary Note 19)
A method for manufacturing a power cable, including:
a step of preparing a resin composition that contains a base resin including a polyolefin and an inorganic filler including silicon dioxide and in which a content N of the inorganic filler is 0.1 parts by mass or more and 5 parts by mass or less with respect to 100 parts by mass of the base resin; and
a step of forming an insulating layer using the resin composition so as to cover an outer circumference of a conductor,
wherein the step of preparing a resin composition includes a step of surface-treating the inorganic filler with a silane coupling agent, and
in the step of surface-treating the inorganic filler, a moisture content in an atmosphere in which the inorganic filler is surface-treated is set to 0.1 $g/m^3$ or less so that the following expression (2) is satisfied, $$V<2.5N+67.5 \qquad (2)$$

where V represents brightness in a HSV color space measured by forming a sheet with a thickness of 2 mm from the insulating layer, folding the sheet at 24° C., and observing a cross section of a folded portion of the sheet, and the unit used to express V is %,
when a sheet of an insulating layer that does not contain the inorganic filler is folded under the same conditions and a folded cross section of the sheet is observed, V is 50%, and
when a sheet of an insulating layer containing 5 parts by mass of an inorganic filler that has not been surface-treated is folded under the same conditions and a folded cross section of the sheet is observed, V is 80%.

(Supplementary Note 20)
The method for manufacturing a power cable according to Supplementary Note 18 or 19,
wherein, in the step of surface-treating the inorganic filler, the inorganic filler having a moisture content of 3 wt % or less is used.

(Supplementary Note 21)
The method for manufacturing a power cable according to any one of Supplementary Notes 18 to 20,
wherein, in the step of surface-treating the inorganic filler, a solution obtained by diluting the silane coupling agent with an organic solvent having a water concentration of 7 vol % or less is used.

REFERENCE SIGNS LIST

10 DC power cable
110 Conductor
120 Inner semi-conductive layer
130 Insulating layer
140 Outer semi-conductive layer
150 Shielding layer
160 Sheath

The invention claimed is:
1. A resin composition comprising:
a base resin including a polyolefin; and
an inorganic filler including silicon dioxide and surface-treated with a silane coupling agent,
wherein the inorganic filler is surface-treated under conditions in which a moisture content in an atmosphere in which the inorganic filler is surface-treated is set to 0.1 $g/m^3$ or less, and
a remaining rate R of the inorganic filler in a fractured frozen surface is 50% or more,
the remaining rate R being calculated using the following expression (1),

$$R=(Df/Dc)\times 100 \qquad (1)$$

where Df represents a density of the inorganic filler remaining in a fractured surface of a sheet formed of the resin composition containing the base resin and the inorganic filler, when the sheet is immersed in liquid nitrogen for 1 hour and then fractured, and
Dc represents a reference density of the inorganic filler detected in a cut surface of the sheet formed of the resin composition, when the sheet is cut at 24° C. using a focused ion beam without being frozen,
wherein, when a DC electric field of 200 kV/mm is applied in a thickness direction of the sheet at a temperature of 90° C. after a predetermined heat cycle test, the time it takes until a dielectric breakdown occurs in the sheet is 1 hour or longer,
the heat cycle test being a test in which a cycle including a step of holding the resin composition at a temperature of −10° C. for 8 hours and a step of holding the resin composition at a temperature of 24° C. for 16 hours is repeated for 3 months.

2. A power cable comprising:
a conductor; and
an insulating layer provided so as to cover an outer circumference of the conductor,
wherein the insulating layer is constituted by a resin composition containing: a base resin including a polyolefin; and an inorganic filler including silicon dioxide and surface-treated with a silane coupling agent, and
the inorganic filler is surface-treated under conditions in which a moisture content in an atmosphere in which the inorganic filler is surface-treated is set to 0.1 g/m$^3$ or less,
a remaining rate R of the inorganic filler in a fractured frozen surface is 50% or more, and
the remaining rate R being calculated using the following expression (1), $$R=(Df/Dc)\times 100 \tag{1}$$

where Df represents a density of the inorganic filler remaining in a fractured surface of a sheet formed from the insulating layer, when the sheet is immersed in liquid nitrogen for 1 hour and then fractured, and
Dc represents a reference density of the inorganic filler detected in a cut surface of the sheet formed from the insulating layer, when the sheet is cut at 24° C. using a focused ion beam without being frozen,
wherein, when a DC electric field of 200 kV/mm is applied in a thickness direction of the insulating layer at a temperature of 90° C. after a predetermined heat cycle test, the time it takes until a dielectric breakdown occurs in the insulating layer is 1 hour or longer,
the heat cycle test being a test in which a cycle including a step of holding the power cable at a temperature of −10° C. for 8 hours and a step of holding the power cable at a temperature of 24° C. for 16 hours is repeated for 3 months.

3. The power cable according to claim 2,
wherein the inorganic filler is surface-treated with a material other than silane coupling agents having three hydrolyzable groups and only one alkyl group per silicon atom, as the silane coupling agent.

4. The power cable according to claim 3,
wherein the inorganic filler is surface-treated with at least one material selected from vinyltrimethoxysilane, vinyltriethoxysilane, 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene) propylamine, dimethyldimethoxysilane, methoxytrimethylsilane, hexamethyldisilazane, dimethyldichlorosilane, and trimethylchlorosilane, as the silane coupling agent.

5. The power cable according to claim 3,
wherein the remaining rate R is 60% or more.

6. The power cable according to claim 3,
wherein, when a DC electric field of 200 kV/mm is applied in a thickness direction of the insulating layer at a temperature of 90° C. after a predetermined heat cycle test, the time it takes until a dielectric breakdown occurs in the insulating layer is 2 hours or longer,
the heat cycle test being a test in which a cycle including a step of holding the power cable at a temperature of −10° C. for 8 hours and a step of holding the power cable at a temperature of 24° C. for 16 hours is repeated for 3 months.

7. The power cable according to claim 2,
wherein the inorganic filler is surface-treated with a material having a vinyl group at a terminal end, as the silane coupling agent.

8. The power cable according to claim 2,
wherein the inorganic filler is surface-treated with a material having an amino group, as the silane coupling agent.

9. A power cable comprising:
a conductor; and
an insulating layer provided so as to cover an outer circumference of the conductor,
wherein the insulating layer is constituted by a resin composition containing: a base resin including a polyolefin; and an inorganic filler including silicon dioxide and surface-treated with a silane coupling agent,
the inorganic filler is surface-treated under conditions in which a moisture content in an atmosphere in which the inorganic filler is surface-treated is set to 0.1 g/m$^3$ or less,
a content N of the inorganic filler in the resin composition is 0.1 parts by mass or more and 5 parts by mass or less with respect to 100 parts by mass of the base resin, and
the following expression (2) is satisfied, $$V<2.5N+67.5 \tag{2}$$

where V represents brightness in a HSV color space measured by forming a sheet with a thickness of 2 mm from the insulating layer, folding the sheet at 24° C., and observing a cross section of a folded portion of the sheet, and the unit used to express V is %,
when a sheet of an insulating layer that does not contain the inorganic filler is folded under the same conditions and a folded cross section of the sheet is observed, V is 50%, and
when a sheet of an insulating layer containing 5 parts by mass of an inorganic filler that has not been surface-treated is folded under the same conditions and a folded cross section of the sheet is observed, V is 80%,
wherein, when a DC electric field of 200 kV/mm is applied in a thickness direction of the insulating layer at a temperature of 90° C. after a predetermined heat cycle test, the time it takes until a dielectric breakdown occurs in the insulating layer is 1 hour or longer,
the heat cycle test being a test in which a cycle including a step of holding the power cable at a temperature of −10° C. for 8 hours and a step of holding the power cable at a temperature of 24° C. for 16 hours is repeated for 3 months.

10. The power cable according to claim 9,
wherein the inorganic filler is surface-treated with a material other than silane coupling agents having three hydrolyzable groups and only one alkyl group per silicon atom, as the silane coupling agent.

11. The power cable according to claim 10,
wherein the inorganic filler is surface-treated with at least one material selected from vinyltrimethoxysilane, vinyltriethoxysilane, 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene) propylamine, dimethyldimethoxysilane, methoxytrimethylsilane, hexamethyldisilazane, dimethyldichlorosilane, and trimethylchlorosilane as the silane coupling agent.

12. The power cable according to claim 10, satisfying the following expression (3), $$V<5N+55 \qquad (3).$$

13. The power cable according to claim 10,
wherein, when a DC electric field of 200 kV/mm is applied in a thickness direction of the insulating layer at a temperature of 90° C. after a predetermined heat cycle test, the time it takes until a dielectric breakdown occurs in the insulating layer is 2 hours or longer,
the heat cycle test being a test in which a cycle including a step of holding the power cable at a temperature of −10° C. for 8 hours and a step of holding the power cable
at a temperature of 24° C. for 16 hours is repeated for 3 months.

14. The power cable according to claim 9,
wherein the inorganic filler is surface-treated with a material having a vinyl group at a terminal end, as the silane coupling agent.

15. The power cable according to claim 9,
wherein the inorganic filler is surface-treated with a material having an amino group, as the silane coupling agent.

* * * * *